(12) United States Patent
Barber et al.

(10) Patent No.: US 11,894,969 B2
(45) Date of Patent: Feb. 6, 2024

(54) IDENTIFYING ROOT CAUSES OF NETWORK SERVICE DEGRADATION

(71) Applicant: Ciena Corporation, Hanover, MD (US)

(72) Inventors: Christopher Barber, Ottawa (CA); David Côté, Gatineau (CA); Thomas Triplet, Manotick (CA); Yinqing Pei, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/684,486

(22) Filed: Mar. 2, 2022

(65) Prior Publication Data

US 2023/0011452 A1 Jan. 12, 2023

Related U.S. Application Data

(63) Continuation-in-part of application No. 17/372,678, filed on Jul. 12, 2021, now Pat. No. 11,477,070.

(51) Int. Cl.
*H04L 41/00* (2022.01)
*H04L 41/0631* (2022.01)
(Continued)

(52) U.S. Cl.
CPC .......... *H04L 41/00* (2013.01); *G06F 11/3055* (2013.01); *G06F 16/24558* (2019.01);
(Continued)

(58) Field of Classification Search
CPC ............. G06F 11/3055; G06F 11/3034; G06F 11/0727; G06F 11/079; G06F 16/24558; G06F 9/452; G06F 9/45558; G06F 11/0709; G06F 11/0712; G06F 11/0751; H04L 41/145; H04L 41/0631; H04L 41/142; H04L 41/044; H04L 41/0695; H04L 41/00; H04L 41/0668; H04L 67/1051

See application file for complete search history.

(56) References Cited

U.S. PATENT DOCUMENTS 8,477,679 B2   7/2013   Sharifian et al.
8,887,217 B2   11/2014  Salem et al.
(Continued)

OTHER PUBLICATIONS

Teixeira et al., Advanced Fiber-Optic Acoustic Sensors, Photonic Sensors / vol. 4, No. 3, 2014: 198-208.

*Primary Examiner* — Kyung H Shin
(74) *Attorney, Agent, or Firm* — Clements Bernard Walker; Christopher L. Bernard

(57) ABSTRACT

Systems and methods are provided for analyzing one or more root causes of service degradation events in a network or other environment. A method, according to one implementation, includes a step of monitoring a plurality of overlying services offered in an underlying infrastructure having a plurality of resources arranged with a specific topology. In response to detecting a negative impact on the overlying services during a predetermined time window and based on an understanding of the specific topology, the method further includes the step of identifying suspect components from the plurality of resources in the underlying infrastructure. The method also includes the step of obtaining status information with respect to the suspect components to determine a root cause of the negative impact on the overlying services.

20 Claims, 15 Drawing Sheets

(51) Int. Cl.
  *H04L 41/5003* (2022.01)
  *H04L 41/0604* (2022.01)
  *G06F 11/30* (2006.01)
  *G06F 16/2455* (2019.01)
  *H04L 41/0695* (2022.01)

(52) U.S. Cl.
  CPC ...... *H04L 41/0613* (2013.01); *H04L 41/0627* (2013.01); *H04L 41/0631* (2013.01); *H04L 41/0695* (2013.01); *H04L 41/5003* (2013.01)

(56) References Cited

U.S. PATENT DOCUMENTS

| | | | |
|---|---|---|---|
| 9,060,292 B2 | 6/2015 | Callard et al. | |
| 9,104,572 B1* | 8/2015 | Thompson | G06F 11/3055 |
| 9,432,257 B2 | 8/2016 | Li et al. | |
| 9,686,816 B2 | 6/2017 | Sun et al. | |
| 9,819,565 B2 | 11/2017 | Djukic et al. | |
| 9,832,681 B2 | 11/2017 | Callard et al. | |
| 9,871,582 B2 | 1/2018 | Djukic et al. | |
| 9,980,284 B2 | 5/2018 | Djukic et al. | |
| 10,015,057 B2 | 7/2018 | Djukic et al. | |
| 10,069,570 B2 | 9/2018 | Djukic et al. | |
| 10,148,578 B2 | 12/2018 | Morris et al. | |
| 10,153,869 B2 | 12/2018 | Djukic et al. | |
| 10,390,348 B2 | 8/2019 | Zhang et al. | |
| 10,448,425 B2 | 10/2019 | Au et al. | |
| 10,491,501 B2 | 11/2019 | Armolavicius et al. | |
| 10,623,277 B2 | 4/2020 | Djukic et al. | |
| 10,631,179 B2 | 4/2020 | Djukic et al. | |
| 10,644,941 B2 | 5/2020 | Djukic et al. | |
| 10,746,602 B2 | 8/2020 | Pei et al. | |
| 10,887,899 B2 | 1/2021 | Au | |
| 10,945,243 B2 | 3/2021 | Kar et al. | |
| 2008/0201462 A1* | 8/2008 | Liss | H04L 41/044 709/223 |
| 2014/0229210 A1 | 8/2014 | Sharifian et al. | |
| 2018/0062943 A1 | 3/2018 | Djukic et al. | |
| 2019/0230046 A1 | 7/2019 | Djukic et al. | |
| 2019/0379589 A1 | 12/2019 | Ryan et al. | |
| 2020/0067935 A1 | 2/2020 | Carnes, III et al. | |
| 2020/0313380 A1 | 10/2020 | Pei et al. | |
| 2020/0351380 A1 | 11/2020 | Fedorov et al. | |
| 2020/0387797 A1 | 12/2020 | Ryan et al. | |
| 2021/0028973 A1 | 1/2021 | Cote et al. | |
| 2021/0076111 A1 | 3/2021 | Shew et al. | |
| 2021/0150305 A1 | 5/2021 | Amiri et al. | |
| 2022/0334903 A1* | 10/2022 | Pole | G06F 16/24558 |

* cited by examiner

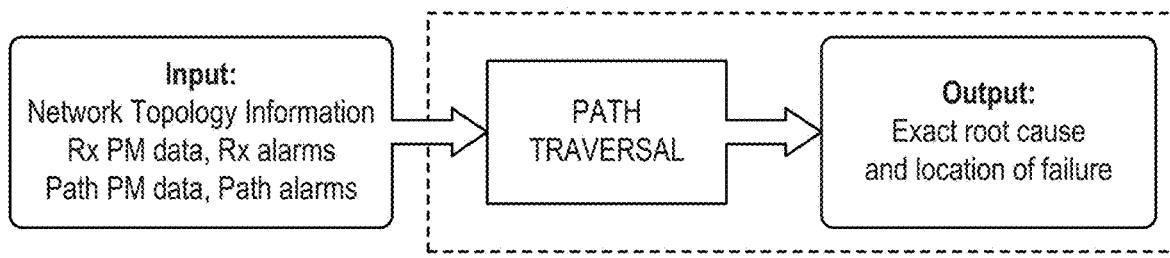
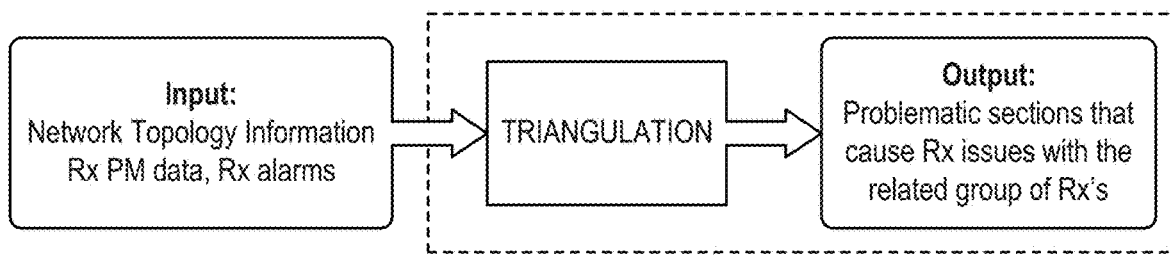
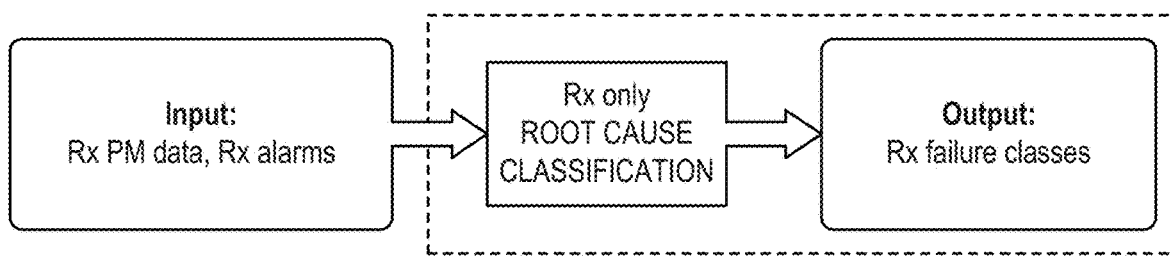
FIG. 4

| Alarm ID | Date | Derived Alarm Raised |
|---|---|---|
| #5.1 | 2020-05-17 | Derived total power LOS |
| #5.2 | 2020-07-01 | Derived total power LOS |
| #5.3 | 2020-07-02 | Derived total power LOS |
| #6.1 | 2020-05-17 | Derived total power LOS |
| #6.2 | 2020-05-18 | Derived total power LOS |
| #6.3 | 2020-07-01 | Derived total power LOS |
| #6.4 | 2020-07-02 | Derived total power LOS |
| #8.1 | 2020-05-17 | Derived total power LOS |
| #8.2 | 2020-05-18 | Derived total power LOS |
| #8.3 | 2020-05-25 | Derived total power LOS |
| #8.4 | 2020-07-01 | Derived total power LOS |
| #8.5 | 2020-07-02 | Derived total power LOS |

| FEATURE | MEANING |
| --- | --- |
| Meta status | Status of the Rx (either in-service or out-of-service) |
| ES (OTU/ODU) | Errored Second |
| SES (OTU/ODU) | Severely Errored Second |
| CV (OTU/ODU) | Code Violation |
| OPR-OCH (AVG/MIN/MAX) | Optical power received |
| OPRN-OCH | Optical power received normalized |
| DGD-OCH (AVG/MAX) | Differential Group delay |
| PRFBER-OTU (MAX) | Pre-FEC Bit Error Rate |
| PFBERE-OTU | Post-FEC Bit Error Rate Estimate |
| FC-ODU | Failure Count |
| FEC-OTU | Forward Error Correction |
| SEFS-OTU | Severely Errored Frame Second |
| UNCFECBLK-OTU | Uncorrected FEC Block |
| HCCS-OTU | High Correction Count Second |
| UAS-ODU | Unavailable Seconds |

FIG. 13

| Class | Precision | Recall | F1 score |
| --- | --- | --- | --- |
| Loss of signal at Rx | 0.97 | 0.90 | 0.93 |
| Loss of signal in the path | 0.94 | 0.97 | 0.96 |
| Other | 0.85 | 0.90 | 0.87 |
| Power degradation in the link | 0.85 | 0.74 | 0.79 |
| Transient | 0.88 | 0.94 | 0.91 |

FIG. 14

IDENTIFYING ROOT CAUSES OF NETWORK SERVICE DEGRADATION

CROSS-REFERENCE TO RELATED APPLICATIONS

This application is a Continuation-In-Part (CIP) of application Ser. No. 17/372,678, filed Jul. 12, 2021, and entitled "Identifying root causes of network service degradation." Also, this application claims the benefit of priority to the parent application and incorporates by reference herein the contents thereof.

TECHNICAL FIELD

The present disclosure generally relates to networking systems and methods. More particularly, the present disclosure relates to detecting degradation events of overlying services and identifying one or more root causes of the impacted services in the underlying components of a network based on timing and topology characteristics.

BACKGROUND

Telecommunications networks are typically managed by a team of network operators. These network operators have the responsibility of minimizing service disruptions when failures occur in the network, such as by quickly and precisely determining the location and the root cause of failures.

Typically, Root Cause Analysis (RCA) is performed manually by the team of domain experts who leverage various types of data, such as equipment Performance Monitoring (PM) data and standard alarms. For example, the standard alarms may be provided when certain parameters (e.g., PM data) cross certain threshold values. In addition to path PM data and path alarms, the team of experts can also utilize other data, such as services PM data, service alarms, network topology, and configuration logs.

Currently, RCA requires expert knowledge of the telecommunications network. Typically, if a failure occurs in a network using equipment from one vendor, that vendor is usually going to be called. This may mean that the vendor may need experts who can be ready at any time to troubleshoot and recover the failure. For multi-vendor, multi-layer applications, end-to-end domain expertise is usually not available for all network equipment.

The conventional troubleshooting procedure requires the availability of all of the above-mentioned types of data (i.e., path PM data, standard path alarms, service PM data, standard service alarms, network topology information, and configuration logs, etc.). Also, the troubleshooting procedure is normally performed manually by the network operators. For example, the troubleshooting procedure may require looking at the PM and alarm data from different ports and sources and stitching the paths of failed services. In addition, among the substantial amounts of PM data and alarms reported in a path, the domain experts usually have to manually identify the specific alarm or abnormal PM data that might be recognized as the root cause of the service issues.

Since some failures on the path may not set any alarms and may not be recognized as an issue, even experts may not be able to diagnose network problems quickly and accurately. Therefore, there is a need in the field of network management to detect the root cause of service failures quickly and accurately and/or signal degradation when PM data and alarms are obtained and to detect root causes, even when an incomplete dataset of PM data and alarms is obtained or when end-to-end network expertise is unavailable.

BRIEF SUMMARY

The present disclosure is directed to systems, methods, and non-transitory computer-readable media for performing Root Cause Analysis (RCA) in a communications network. According to the various embodiments described in the present disclosure, RCA procedures may be performed with incomplete data and without the need for expertise from a network operator. A method, according to one implementation, includes the step of receiving any of Performance Monitoring (PM) data, standard path alarms, service PM data, standard service alarms, network topology information, and configuration logs from equipment configured to provide services in a network. Also, the method includes the step of automatically detecting a root cause of a service failure or signal degradation from the available PM data, standard path alarms, service PM data, standard service alarms, network topology information, and configuration logs.

According to other implementations, a process for performing RCA may be associated with the functionality of a root cause analyzer. In one embodiment, the process may include a first step of monitoring a plurality of overlying services offered in an underlying infrastructure having a plurality of resources arranged with a specific topology. In response to detecting a negative impact on one or more of the overlying services during a predetermined time window and based on an understanding of the specific topology, the process may include the step of identifying one or more suspect components from the plurality of resources in the underlying infrastructure. Also, the process may include the step of obtaining status information with respect to the one or more suspect components to determine a root cause of the negative impact on the one or more overlying services.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 4 is a diagram illustrating different use cases for performing root cause analysis based on different levels of availability of network data, according to various embodiments.

FIG. 13 is a table illustrating a sample of PM names obtained from an example network for root cause analysis, according to various embodiments.

FIG. 14 is a table illustrating example machine learning results related to the third use case shown in FIG. 4, according to various embodiments.

DETAILED DESCRIPTION

The present disclosure relates to systems and methods for monitoring telecommunications networks and performing Root Cause Analysis (RCA) to determine a root cause of service failures and/or signal degradation in the network. As described in the present disclosure, the embodiments for performing RCA can include procedures that can be a) executed automatically, b) used even in situations where there is incomplete data, c) learned from historical data, d) performed without networking domain expertise, and e) applied to a variety of communications network services (e.g., optical networks).

Figure 1:
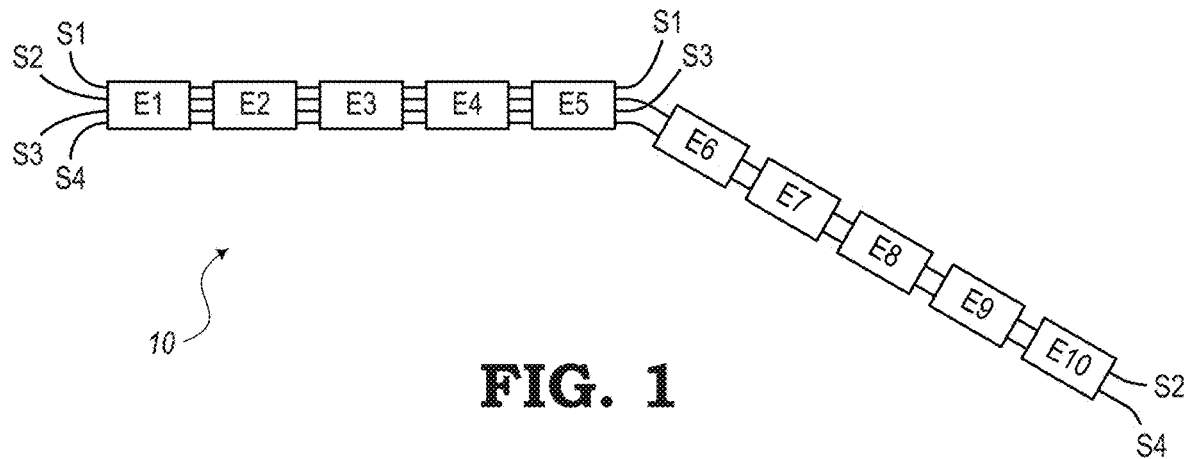
FIG. 1 is a block diagram illustrating an example of underlay equipment configured to support multiple overlay services, according to various embodiments of the present disclosure.

FIG. 1 is a block diagram illustrating an embodiment of a portion of a network 10 having underlay equipment (E1, E2, . . . , E10). The underlay equipment E1, E2, . . . , E10 is configured to support multiple overlay services (S1, S2, S3, S4). In this example, suppose that one or more of the services S1-S4 fails or degrades. As mentioned above, a network operator would want to identify the root cause of these issues so that proper remediation can be performed to restore the network 10. For example, according to some embodiments, a root cause may be associated with a specific alarm raised with respect to a specific piece of equipment E1-E10 at a given time. The alarm may be associated with the piece of equipment itself or with a communication path or link connecting one piece of equipment to an adjacent piece.

Ideally, the availability of all relevant data regarding the network 10 would be useful for determining the root cause. However, at times, not all of this data may be available and therefore alternative procedures may need to be performed to adequately detect the root cause. The embodiments of the present disclosure are configured to determine root cause based on any amount of data that is available. For example, as described in more detail below, a first procedure may be performed when all (or much) of the relevant data is available.

In particular, this "relevant data" may include Performance Monitoring (PM) data associated with each of the pieces of equipment E1-E10 on the path (i.e., path PM data), standard alarms that are often associated with the equipment E1-E10 on the path (i.e., standard path alarms), PM data associated with each of the services S1-S4 (i.e., service PM data), standard alarms that are often associated with the services S1-S4 (i.e., standard service alarms), topology of the network 10, and configuration logs. In this embodiment, the term "topology" may include the physical devices (e.g., equipment E1-E10) and the connectivity of the equipment (e.g., communication or transmission paths between the respective pairs of equipment) configured to provide the services.

According to some embodiments, "services" may include, for example, optical Dense Wavelength Division Multiplexing (DWDM) operations, Internet Protocol (IP) and/or Multi-Protocol Label Switching (MPLS) operations, virtual Local Area Network (vLAN) operations, Layer 3 (L3) Virtual Private Network (VPN) operations, Software-Defined Wide Area Network (SD-WAN) tunnel operations, etc. As shown in FIG. 1, services S1 and S3 may utilize equipment E1 as a transmitter (Tx) device and equipment E5 as a receiver (Rx) device. Services S2 and S4 may utilize E1 as a Tx device and E10 as a Rx device. Thus, the services S1-S4 may include a specific Tx device, Rx device, and one or more additional devices forming a path in the network 10.

The standard alarms (e.g., standard path alarms and standard service alarms) that may be threshold-crossing alarms or other similar alarms that may normally be used for indicating issues in the network 10. In addition to these standard alarms, the embodiments of the present disclosure introduce a new type of alarm that may be calculated from the PM data. These new alarms may be different from the standard alarms and can be used along with the standard alarms. In some embodiments, the new alarms may be referred to as "derived alarms" since they may be derived from the PM data using any suitable rules, algorithms, techniques, procedures, etc. For example, these derived alarms may be associated with conditions of the network 10 that may impact or may likely have an impact on any of the services S1-S4 of the network 10. Therefore, the present disclosure is able to calculate these derived alarms to capture issues that may otherwise be invisible to network operators or other experts.

According to some embodiments, the derived alarms may include, for example, a) specific PM data patterns (e.g., power drop), b) abnormal PM data patterns detected by anomaly detection, c) specific network configuration changes, etc. The derived alarms may be associated with conditions (or issues) with the Tx devices, Rx devices, ports, paths, connections, links, topology, etc.

Figure 2:
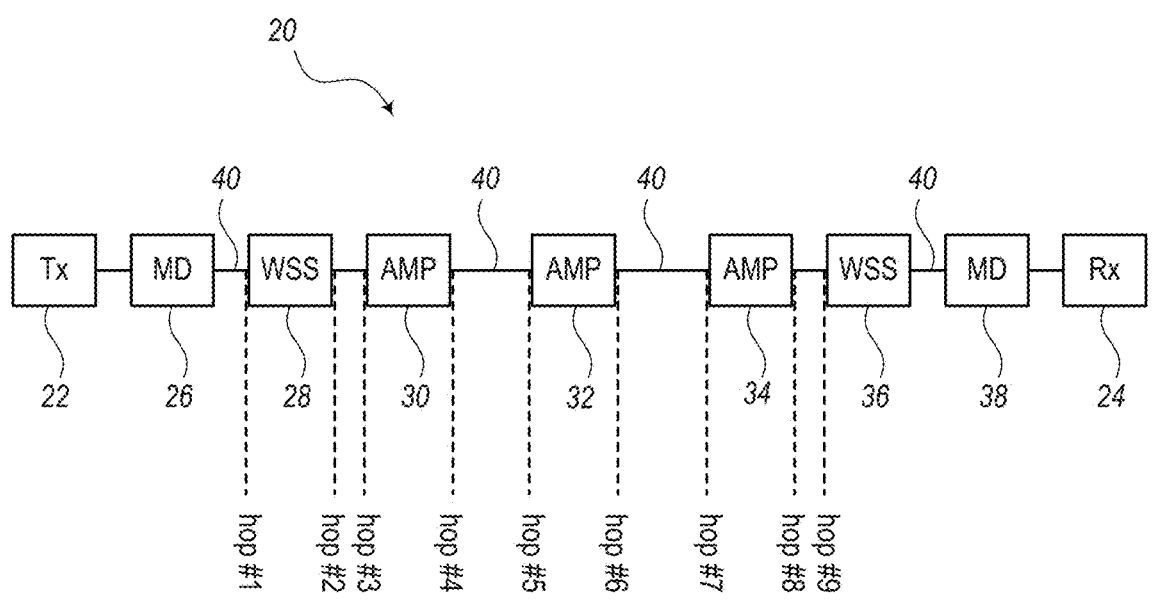
FIG. 2 is a block diagram illustrating a service path of a network, according to various embodiments.

FIG. 2 is a block diagram showing an embodiment of a portion of a network 20. In this embodiment, the network 20 includes a service path for enabling a transmitter (Tx) device 22 to provide a network service to a receiving (Rx) device 24. The service path of the network 20 also includes a Multiplexer/Demultiplexer (MD) device 26, a Wavelength Selective Switch (WSS) 28, a first amplifier 30, a second amplifier 32, a third amplifier 34, another WSS 36, and another MD device 38. The service path also includes a number of links 40 or transmission paths connecting adjacent devices 22, 24, 26, 28, 30, 32, 34, 36, 38 together. The links 40 may be configured to connect one or more ports of one device to one or more ports of the corresponding adjacent device. For communication, signals are transmitted from one device to another via the connecting link 40, which is regarded as one hop.

The following description includes various root cause procedures for handling various levels of availability of different types of data. The RCA procedures described herein may be applicable to the network 10 of FIG. 1, the network 20 of FIG. 2, or any other suitable type of network configured to provide various network services.

I. Automated Root Cause Analysis (RCA) with Complete Data

In the ideal situation, all the important Tx alarms, path alarms, Rx alarms, topology, etc. would be known and would be available to or possibly calculated by domain experts. In this case, it is possible to determine the root cause of degraded service with a "path traversal" procedure (and/or a "triangulation" procedure as described below). The path traversal procedure may also be referred to as a "circuit traversal" procedure. With reliable labels for identifying path degradation (e.g., "bad path hop") and/or service degradation (e.g., "bad service quality"), the embodiments of the present disclosure may be configured to use Supervised ML (SML) to train multi-variate classifier algorithms. These SML classifiers may outperform domain expert heuristics (e.g., threshold crossings) in complex network scenarios.

II. Automated RCA with Incomplete Domain Expertise

Typically, there may only be a few teams of experts having sufficient domain expertise to perform end-to-end RCA, especially when considering multi-layer and multi-vendor networks. However, it is more common that each network operator might have expertise about only a part of the network. In this situation (with incomplete domain expertise), the present disclosure may use statistical methods (e.g., Machine Learning (ML) methods, etc.) to infer the consequences of the limited expert knowledge to correlated data about which there is little or no expertise. In particular, the present embodiments can encode domain expertise with data "labels" in a SML framework, using either the current domain expertise or third-party data (e.g., Network Operating Center (NOC) tickets, etc.).

A. Identified Degraded Services without Path PMs and Alarms

It may be possible in a network to know how to identify degraded services from Rx alarms (e.g., "bad service quality" labels), but without domain expertise about path alarms. In this case, the embodiments of the present disclosure may be configured to perform one or more different procedures. For example, in this situation, the embodiments may include a) training SML models to determine path alarm patterns that are service-affecting or service-impacting, b) using a feature-ranking process provided by the trained SML model to determine which Tx alarms and path alarms are important (and possibly suppress other path alarms), c) using anomaly detection to determine Tx alarm patterns and path alarm patterns that are service-affecting, d) using Pearson correlation (or other similar statistical process) to determine which Tx alarms and path alarms are correlated with relevant Rx alarms (and possibly suppress the others), and/or e) using Pearson correlation and/or SML models to test if new derived alarms are service-affecting.

One difficulty with conventional SML models for these tasks is that the number of hops along a path may change from service to service and may change over time (e.g., after a service re-route). Hence, many conventional algorithms cannot be used because they may require a fixed-size input. The embodiments of the present disclosure, however, is configured to overcome this difficulty and provide solutions to this problem. For example, the present embodiments may include procedures to a) aggregate PM data and alarms along the path to a fixed size (e.g., use average values, minimum values, maximum values, etc. each PM parameter) before feeding the SML classifier, b) use a long fixed-size input vector corresponding to the max number of hops, leave null for hops that are not present, and use an algorithm that can handle null inputs (e.g., XGBoost), and/or c) use Recurrent Neural Network (RNN) family of algorithms, input each path hop sequentially, and make and inference after seeing all hops (for any number of hops).

B. Identified Equipment/Path Alarms without Service-Impact Knowledge

It may be possible in the network to know how to identify important path alarms (e.g., device alarms, path alarms, "bad path hop" labels, etc.), but without knowing the expected impact on overlay services. In this case, the embodiments of the present disclosure may be configured to a) train SML model to determine Rx alarms patterns that are indicative of underlay path issues, b) use feature-ranking procedure provided by the SML model to determine which Rx alarms are important (and possibly suppress the other Rx alarms), c) use anomaly detection to determine Rx alarm patterns that are indicative of underlay path issues, d) use Pearson correlation to determine which Rx alarms are correlated with important path alarms, and/or e) use Pearson and/or SML to test if new derived alarms are indicative of underlay path issues.

Similar to the situation above with "identified degraded services without equipment/path alarms," one difficulty with SML models for these tasks is that the number of services may change from hop to hop and may change over time (e.g., after new services are provisioned, deleted, re-routed, etc.). The present disclosure therefore provides similar solutions, including a) performing PM data and alarm aggregation across services before feeding the fixed-size classifier, b) use a long fixed-size input vector corresponding to a max number of services, leave nulls for services not present, and use an algorithm that can handle nulls (e.g., XGBoost), and/or c) use RNN family of algorithms, input each service (Rx alarms) sequentially, and make an inference after seeing all services (for any number of services).

C. Additional Processes

As a result of the above scenarios, the present embodiments can obtain a list of Tx alarms and path alarms or alternatively obtain a list of Rx alarms about which there may be little or no domain expertise. From these results, the systems and methods of the present disclosure may effectively create new derived alarms that are known to be effective to 1) identify overlay service issues or 2) underlay infrastructure issues. These additional derived alarms can then be used like standard alarms in an RCA process, which may include a utilization of standard alarms and derived alarms to locate the root-cause of service failure/degradation (e.g., as described below with respect to use case #1) and may include RCA with incomplete data.

Furthermore, collecting and accessing complete data from the entire network may be possible, but it is also expensive. Having access to only a subset of the data is usually a more common scenario. With incomplete data, the present embodiments would not use the "path traversal" (or circuit traversal) method but may instead use 1) a triangulation procedure from services, which may include obtaining Rx alarms and network topology information, but not equipment/path alarms (e.g., as described below with respect to use case #2), or 2) another procedure where only Rx alarms are obtained, but not topology (e.g., as described below with respect to use case #3). With expert rules, these methods can be used a straightforward manner. With ML, they can also be used for inference, but a complete data set may need to be available for model training and testing.

According to various embodiments, the present disclosure provides a suite of solutions for performing RCA when there is a service failure on a network (e.g., network 10, 20, etc.). The RCA solutions may include automatically providing diagnostics in spite of incomplete data and without domain expertise. The present disclosure may be configured to I) automatically create derived alarms with incomplete domain expertise, II) automatically create derived alarms for optical networks based on domain expertise III) automatically select service-affecting alarms amongst all standard alarms and derived alarms that could be the root cause of a service failure, IV) utilize the selected service affecting alarms to locate the root-cause of service degradation, V) locate the root-cause with incomplete data, and VI) determine generalization to multi-vendor and multi-layer services, each of which is described in more detail below.

1. Automatically Create Derived Alarms with Incomplete Domain Expertise

A. One possible scenario includes a case where only service degradation information (e.g., "bad service quality" labels) is available, but no domain expertise about an underlay path (e.g., links 40). The process for this scenario may be similar to the "Automated Root Cause Analysis (RCA) with complete data" section described above and may include:
1. using Pearson correlation to determine which path alarms are useful for service assurance (SA) task;
2. training SML model to create new derived alarms from path information for a Service Assurance (SA) task;
3. identifying abnormal path PM behavior with anomaly detection for SA task; and
4. using SML feature ranking to determine which path alarms are useful for SA task.

B. Another possible scenario includes a case where only path alarms (e.g., "bad path hop" labels) are available, but no domain expertise about overlay services (e.g., S1-S4. The process for this scenario may be similar to the "Automated RCA with incomplete domain expertise" section described above and may include:
1. using Pearson correlation to determine which Rx alarms are useful for Network Assurance (NA) task;
2. training SML model to create new derived alarms from services information for NA task;
3. identifying abnormal Rx PM behavior with anomaly detection for NA task; and
4. using the SML feature-ranking process to determine which services alarms are useful for NA task.

C. Another possible scenario includes a case where either path alarms (e.g., "bad hop" labels) with varying number of overlay services or service degradation (e.g., "bad service" labels) with varying number of underlay hops. The process for this scenario may use various techniques, procedures, algorithms, etc. to handle varying size inputs and may include:
1. aggregating Tx PM data, Tx alarms, path PM data, path alarms, Rx PM data, and/or Rx alarms to a fixed-size vector, before inputting SML results;
2. using long fixed-size input (corresponding to max possible length), leave null for missing items, and use an algorithm that can handle null (e.g., XGBoost); and
3. using Recurrent Neural Network (RNN) family of techniques/algorithms, input each item sequentially, and make an inference after considering the items 2. Automatically Create Derived Alarms for Optical Networks Based on Domain Expertise D. Another possible scenario includes a case where new specific derived alarms indicative of issues or changes of the network (which are not captured by existing alarms) are derived. The network issues may include:
1. abnormal behavior of PM data (e.g., minor changes, as described below); and
2. configuration changes from log files or NOC tickets, such as:
   a. channel add, delete, and/or re-route changes,
   b. manually set channels/equipment in-service or out-of-service, and
   c. system optimization
3. Automatically select service-affecting alarms amongst all standard alarms and derived alarms that could be the root cause of a service failure E. Another possible scenario includes a case where without sufficient domain expertise, alarms that are service affecting are selected amongst all standard alarms and derived alarms by a) use feature-ranking procedure provided by the SML model b) use Pearson correlation to determine which Rx alarms are correlated with important path alarms, IV. Utilization of Selected Service Affecting Alarms to Locate the Root-Cause of Service Degradation F. Another possible scenario includes a case where a single root cause may be automatically identified from a list of standard alarms and/or derived alarms. This process may include:
1. a "path traversal" process for one or more degraded service or one or more alarms to identify a first hop as the root cause;
2. a "triangulation" process for a group of several service failures and/or degradations at the same time in a similar way to identify a root cause as being on a common hop;
3. a "Rx only" process when Rx patterns indicate the type of root cause along the path (but not where the issue is); and
4. A combination of the "path traversal," "triangulation," and "Rx only" processes, which may include:
   a. triangulation to find a multi-hop section,
   b. traversal to find alarm on the first common hop, which is the root-cause, and
   c. if several alarms are found, Rx only may resolve the ambiguity.

V. Locating the Root-Cause with Incomplete Data

G. Another possible scenario includes a case where RCA may include the triangulation process when path PMs/ alarms are not available. From a list of many services, the embodiment can locate common root-cause sections. This process may include:
1. Triangulation from services, which may utilize Rx alarms and network topology information, but not path alarms, and
2. Rx only process, which may utilize only Rx alarms, but not network topology information.

VI. Generalization to Multi-Vendor and Multi-Layer Services

H. Another possible scenario includes a case where all the above procedures may be applied to a variety of telecommunications network services, such as:
1. Layer-1: DWDM channels,
2. Layer-2: vLAN,
3. Layer-3: IP/MPLS tunnels, L3 VPN, and
4. Over the top: SD-WAN tunnels.

Figure 3:
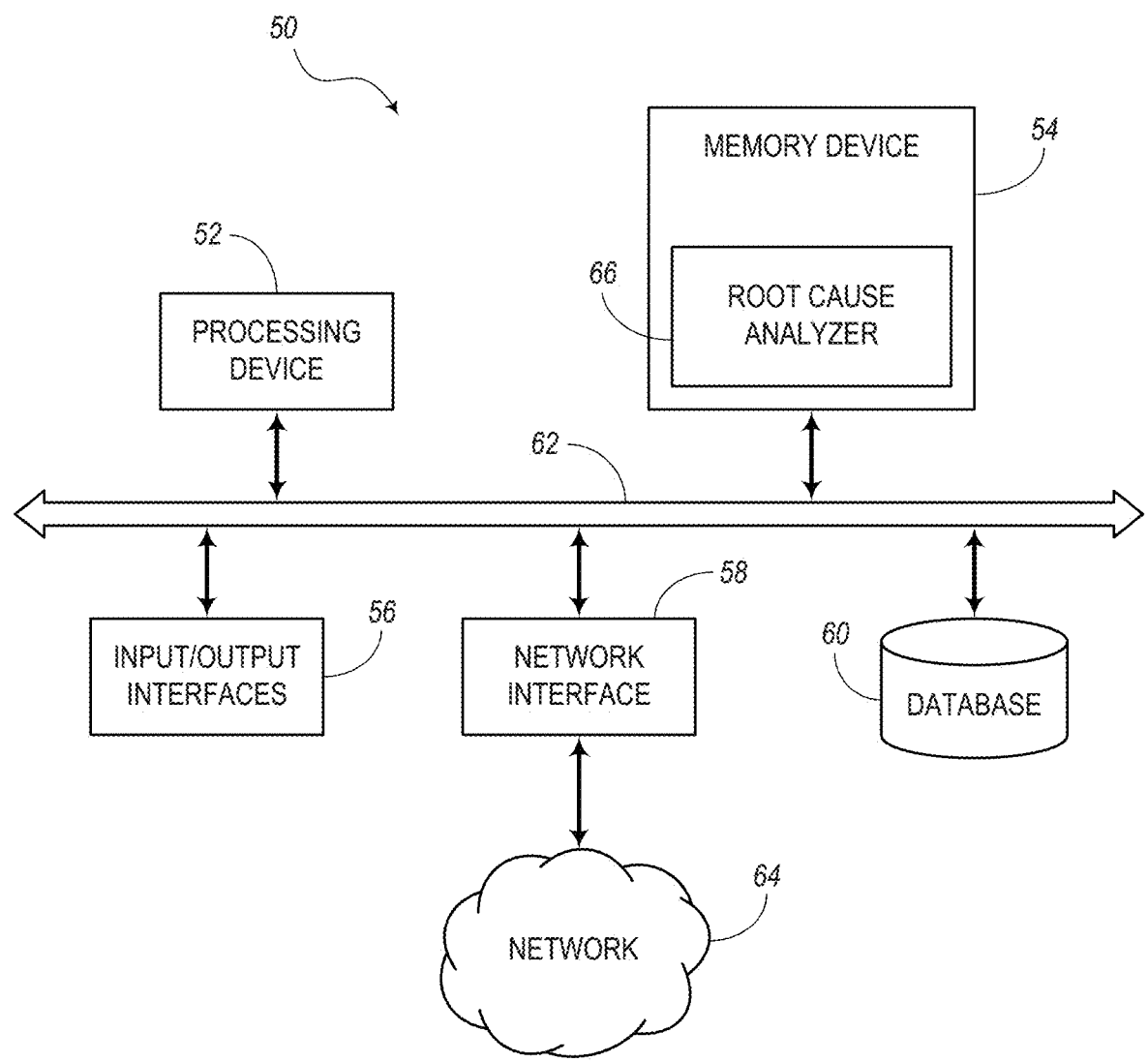
FIG. 3 is a block diagram illustrating a computing system configured to analyze root causes of network service degradation, according to various embodiments of the present disclosure.

FIG. 3 is a block diagram illustrating an embodiment of a computer system 50 configured to analyze root causes of network service degradation. The computer system 50 may be implemented in a Network Management System (NMS), Network Operations Center (NOC), or other suitable management facility for managing a network. In some embodiments, the computer system 50 may be usable by one or more network operators, network administrators, network technicians, etc. working in association with the NMS, NOC, etc. For example, the computer system 50 may be configured to perform various high-level methods as described herein. The methods can be used in combination with expert rules and/or ML classifiers to prepare derived alarms and/or derived alarms inputs.

In the illustrated embodiment, the computer device 50 may be a digital computing device that generally includes a processing device 52, a memory device 54, Input/Output (I/O) interfaces 56, a network interface 58, and a database 60. It should be appreciated that FIG. 3 depicts the computer device 50 in a simplified manner, where some embodiments may include additional components and suitably configured processing logic to support known or conventional operating features. The components (i.e., 52, 54, 56, 58, 60) may be communicatively coupled via a local interface 62. The local interface 62 may include, for example, one or more buses or other wired or wireless connections. The local interface 62 may also include controllers, buffers, caches, drivers, repeaters, receivers, among other elements, to enable communication. Further, the local interface 62 may include address, control, and/or data connections to enable appropriate communications among the components 52, 54, 56, 58, 60.

It should be appreciated that the processing device 52, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 52 may also include or utilize stored program instructions (e.g., stored in hardware, software, and/or firmware) for control of the computer device 50 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 54 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 54 may incorporate electronic, magnetic, optical, and/or other types of storage media. The memory device 54 may have a distributed architecture, where various components are situated remotely from one another, but can be accessed by the processing device 52.

The memory device 54 may include a data store, database (e.g., database 60), or the like, for storing data. In one example, the data store may be located internal to the computer device 50 and may include, for example, an internal hard drive connected to the local interface 62 in the computer device 50. Additionally, in another embodiment, the data store may be located external to the computer device 50 and may include, for example, an external hard drive connected to the Input/Output (I/O) interfaces 56 (e.g., SCSI or USB connection). In a further embodiment, the data store may be connected to the computer device 50 through a network and may include, for example, a network attached file server.

Software stored in the memory device 54 may include one or more programs, each of which may include an ordered listing of executable instructions for implementing logical functions. The software in the memory device 54 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 52), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 52 or other suitable circuitry or logic). For example, when executed, the instructions may cause or enable the processing device 52 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 52), or any suitable combination thereof. Software/firmware modules may reside in the memory device 54, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 56 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 58 may be used to enable the computer device 50 to communicate over a network 64, such as the network 10, 20, the Internet, a Wide Area Network (WAN), a Local Area Network (LAN), and the like. The network interface 58 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 58 may include address, control, and/or data connections to enable appropriate communications on the network 64.

In addition, the computer device 50 includes a root cause analyzer 66, which is configured to determine a root cause of signal degradation and/or service failure/interruption in the network 64. The root cause analyzer 66 may be implemented as software or firmware and stored in the memory device 54 for execution by the processing device 52. Alternatively, the root cause analyzer 66 may be implemented as hardware in the processing device 52. According to other embodiments, the root cause analyzer 66 may include any suitable combination of hardware, software, and/or firmware and may include instructions (e.g., stored on a non-transitory computer-readable medium) that enable or cause the processing device 52 to perform various procedures for detecting root causes of service issues as described in the present disclosure.

According to various embodiments of the present disclosure, a system may include the processing device 52 and the memory device 54, which may be configured to store a computer program (e.g., root cause analyzer 66) having instructions. The instructions, when executed, enable the processing device 52 to receive any of Performance Monitoring (PM) data, standard path alarms, service PM data, standard service alarms, network topology information, and configuration logs from equipment configured to provide services in a network. Also, the instructions further enable the processing device 52 to automatically detect a root cause of a service failure or signal degradation from the available PM data, standard path alarms, service PM data, standard service alarms, network topology information, and configuration logs.

The root cause analyzer 66 may further include instructions to enable the processing device 52 to automatically detect the root cause independently of a network operator associated with the network. For example, the network may be a multi-layer, multi-vendor network. The instructions of the root cause analyzer 66 may further enable the processing device 52 to determine one or more derived alarms from the available path PM data, standard path alarms, service PM data, standard service alarms, network topology information, and configuration logs. The derived alarms may be different from the standard path alarms and standard service alarms. The standard path alarms and standard service alarms may be threshold-crossing alarms. The one or more derived alarms may include one or more of PM data patterns, power drops, loss of signal, and network configuration changes. Determining the one or more derived alarms may include determining network conditions that have an impact on the services.

Furthermore, the instructions of the root cause analyzer 66 may further enable the processing device 52 to perform a Pearson correlation procedure, and a Supervised Machine Learning (SML) procedure, a "derived-alarm" generation procedure and a path traversal procedure when the path PM data, standard path alarms, service PM data, standard service alarms, network topology information, and configuration logs are available. The processing device 52 may further be enabled to perform one or more of a triangulation procedure, and a SML procedure when the network topology information is available and alarms related to receiving equipment are available. The instructions can also enable the processing device 52 to perform a SML procedure for multi-variate root cause classification when alarms related to receiving equipment are available for identifying the service failure or signal degradation.

According to additional embodiments, the instructions of the root cause analyzer 66 may also enable the processing device 52 to rank the standard path alarms based on a level of impact the respective standard path alarms have on the services. For example, ranking the standard path alarms may include utilizing a Pearson correlation technique to determine a usefulness of transmission paths for a service assurance procedure. Also, in some embodiments, the system may be configured for use with an optical network having at least a transmitter device, a receiver device, and one or more network devices configured to communicate optical signals along transmission paths.

FIG. 4 is a diagram illustrating different use cases for performing Root Cause Analysis (RCA) based on different levels of availability of network data. In some embodiments, the RCA may be executed with respect to the root cause analyzer 66 shown in FIG. 3. Three use cases, as illustrated, may be based on various availability characteristics of network topology information, Rx PM data, Rx alarms, path PM data, and path alarms. Three processes may correspond to the illustrated use cases, the processes including a "path traversal" technique, a "triangulation" technique, and an "Rx-only" technique.

Use Case #1: "Path Traversal" with Full Knowledge of Network Topology Information, PM Data, and Alarms of Entire Network For this use case, the "path traversal" procedure is performed. Input features includes network topology information, Rx PM data, and alarms from each port along the path.

Output labels may include a label for a good circuit or bad circuit (e.g., Rx PM data or alarms), and a label of a good hop (e.g., ports and link) or bad hop on the path (e.g., port alarms or derived alarms). An example for illustrating the "path traversal" method include reference to the network 30 of FIG. 2. The complete path of the circuit includes the components and links from the Tx device 22 to the Rx device 24 and include specific topology information of the network 30.

Figure 5:
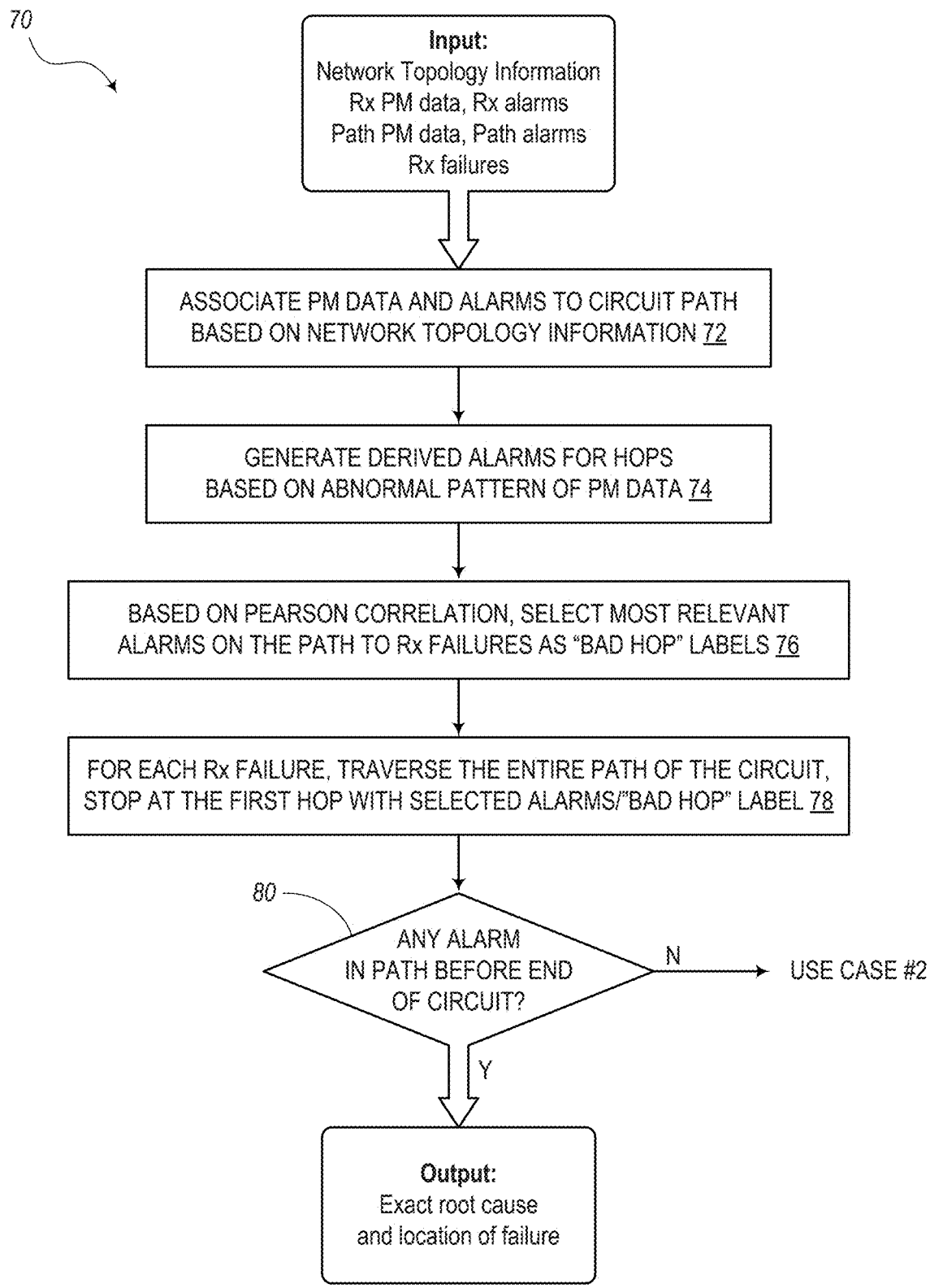
FIG. 5 is a flow diagram illustrating a process related to a first use case shown in FIG. 4, according to various embodiments.

FIG. 5 is a flow diagram illustrating an embodiment of a process 70 related to the first use case shown in FIG. 4. Again, the process 70 relies on input data including network topology information, path PM data, path alarms, Rx PM data, Rx alarms, and Rx failures. As described in the flow chart of FIG. 5, the path traversal process 70 includes a first step (block 72) of associating the PM data and alarm data to each individual hop on the path and Rx, as shown in the graphical data of FIG. 6 described below.

A second step (block 74) of the path traversal process 70 includes generating derived alarms for hops based on abnormal pattern of PM (if it is not captured by any alarms or if the alarm data is missing). It may be noted that many minor power drops may not be captured by alarms with hard-coded threshold. However, these minor power drops could be significant enough to fail the Rx if there is not enough margin allocated. Therefore, it is important to identify and label these power drops for RCA. In this example, abnormal behaviors are detected based on a dynamic threshold between the current day and the most recent day with no failure, where, if the power drop of the current day is greater than the previous good day minimum Q-value minus 6, that is:

$$\text{power\_drop\_threshold} = Q\min_{\text{the most recent good day}} - 6 \quad \text{(Eq.1)}$$

then there is a high possibility that it will have a hit to the received signal. Derived alarms are generated where the abnormal PM pattern is detected and marked in FIG. 4 with <hop #><failure # of the hop>.

Figure 6:
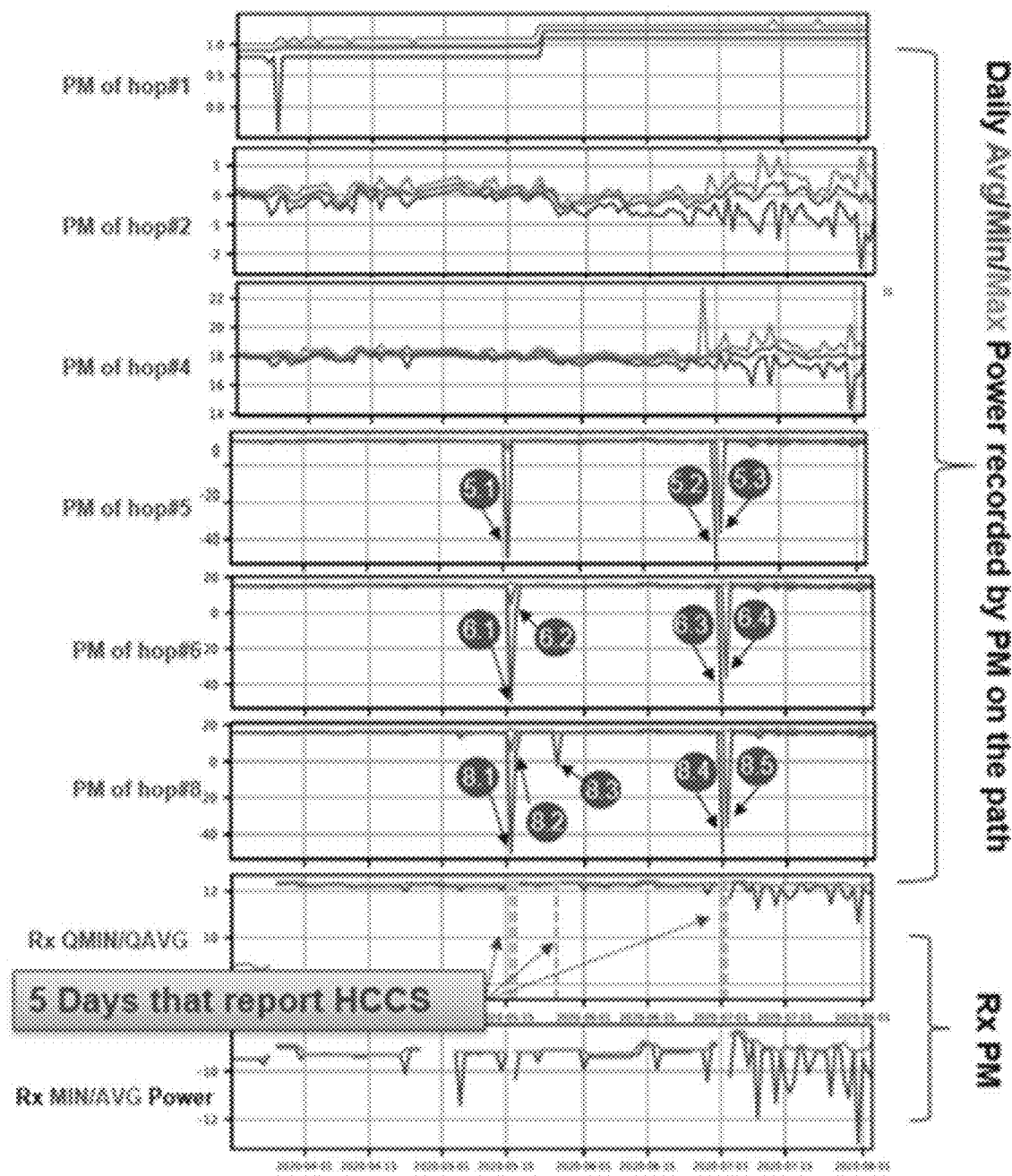
FIG. 6 is a graph illustrating a sample of Performance Monitoring (PM) data obtained in an example network, according to various embodiments.

FIG. 6 shows a graph 84 of a sample of Performance Monitoring (PM) data obtained in an example network. The graph 84 shows PM data related to the different paths 40. For example, the PM data in this example include Daily Min/Max/Avg Power of the various hops (or paths 40) reported by the respective ports. The graph 84 also shows PM data related to Daily $Q_{min}/Q_{avg}$ Power and Daily Min/Avg Power reported by the Rx device 24. According to expert rules, the circuit is considered problematic if High Correction Count Second (HCCS) is reported on the Rx. As shown in the second to last subplot in FIG. 6, HCCS was reported on five different days over the monitoring period in this example. The "path traversal" method may be used in this case for root cause and failure location analysis of these Rx failures. For example, the graph 84 shows three events (i.e., labelled 5.1, 5.2, and 5.3) in the PM data associated with hop #5, four events (i.e., labelled 6.1, 6.2, 6.3, and 6.4) in the PM data associated with hop #6, and five events (i.e., labelled 8.1, 8.2, 8.3, 8.4, and 8.5) in the PM data associated with hop #8.

Figure 7:
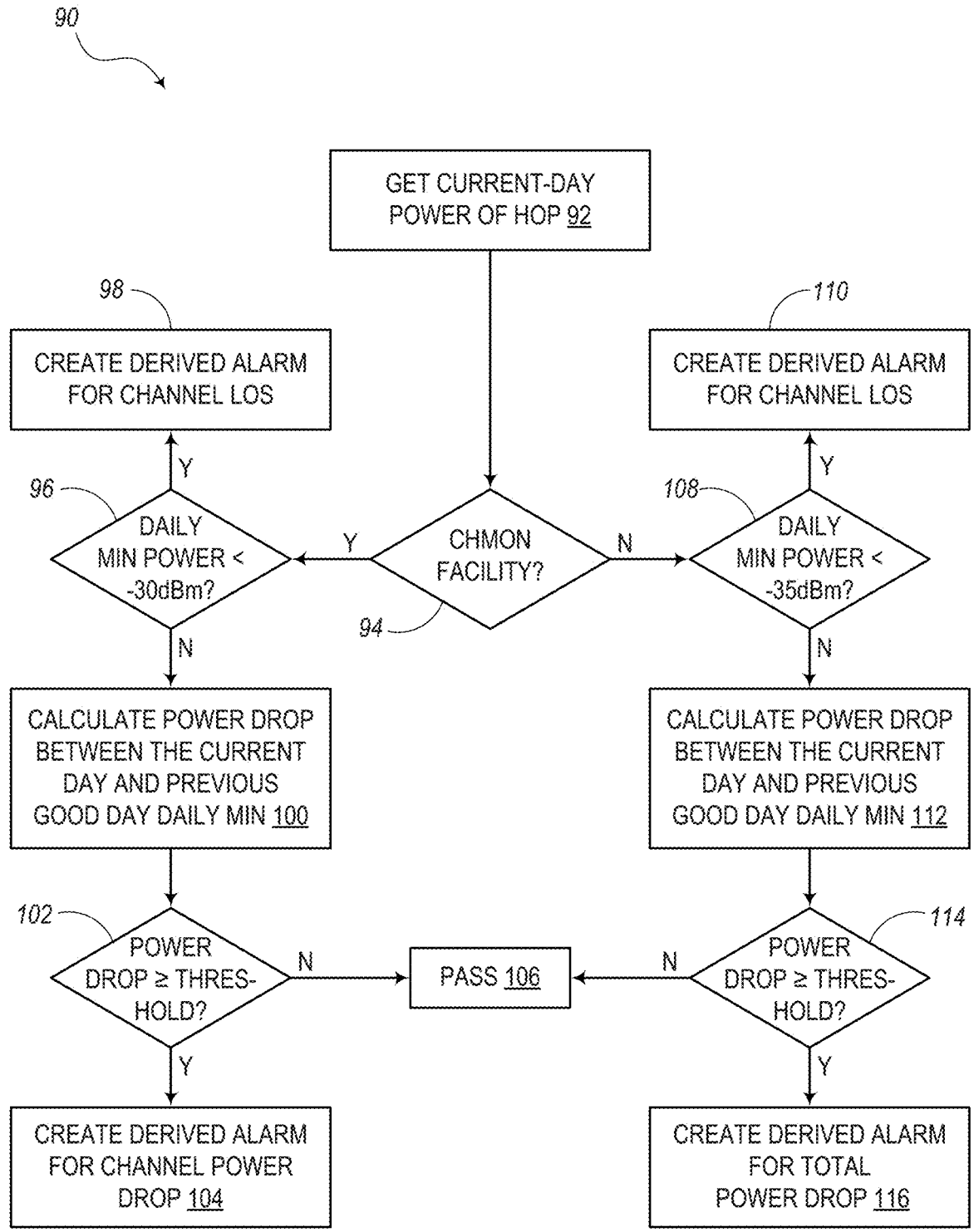
FIG. 7 is a flow diagram illustrating a process for creating additional derived alarms, according to various embodiments.

FIG. 7 is a flow diagram illustrating an embodiment of a process 90 for creating additional derived-alarms based on expert rules. The process 90 include getting current day power of a hop, as indicated in block 92. Then, it is determined whether there is a channel monitoring (CHMON) facility, as indicated in decision block 94. If so, the process 90 proceeds to decision block 96, which includes the step of determining if the daily min power is less than −30 dBm. If so, the process 90 goes to block 98, which includes the step of creating a derived alarm indicating a channel Loss of Signal (LOS). If it is determined in decision block 96 that the daily min power is not less than −30 dBm, then the process 90 goes to block 100, which includes the step of calculating power drop between the current day and the previous good day daily min. The process 90 also includes the step of determining if the power drop is greater than or equal to a threshold, as indicated in decision block 102. If so, the process goes to block 104, which includes the step of creating a derived alarm to indicate a channel power drop. If it is determined that the power drop is less than the threshold, then the process 90 proceeds to block 106.

If is determined in decision block 94 that there is no CHMON facility, then the process 90 proceeds instead to decision block 108. The process 90 includes determining whether the daily min power is greater than −35 dBm, as indicated in decision block 108. If it is greater, then the process 90 goes to block 110, which includes the step of creating a derived alarm to indicate a total power LOS. If it is not greater, then the process 90 goes to block 112, which includes the step of calculating the power drop between the current day and the previous good day daily min. Then, the process 90 includes determining if the power drop is greater than or equal to another threshold. If so, the process 90 goes to block 116, which includes the step of creating a derived alarm indicating a total power drop. Otherwise, if the power drop is less than this threshold, the process 90 goes to block 106, which includes passing (on the creation of any alarm for this hop). The process 90 may be performed in real-time to detect abnormal PM behavior on each hop to help with real-time diagnoses whenever a failure happens in the network.

The process 90 summarizes the expert derived methods that may be used in creating the derived alarms for the network. In this example, there are four derived alarms that may be created when abnormal behavior of channel power and total power is detected from the PM data. If the power is below a hard-coded threshold of invalid low power, a Loss of Signal (LOS) alarm can be raised. If the power dropped for more than a dynamic threshold (e.g., calculated by Eq. 1), a power drop alarm can be raised. Note that derived alarms can also be created based on data driven method such as anomaly detection.

Figures 8, 9:
FIG. 8 is a table illustrating a sample of additional derived alarms created using the first use case shown in FIG. 4, according to various embodiments.
FIG. 9 is a chart illustrating a Pearson correlation between Rx alarms and path alarms in an example network, according to various embodiments.

FIG. 8 is a table 120 illustrating a sample of additional derived alarms created using the first use case shown in FIG. 4. The table 120 shows the detailed derived alarms raised in an example network, where the PM data shown in FIG. 6 is considered. Note that the abnormal pattern detection in this example is based on expert rules. However, in some embodiments, Machine Learning (ML) based anomaly detection can also be used in these procedures.

FIG. 9 is a chart 124 illustrating an example of a Pearson correlation between Rx alarms and path alarms in an example network. Returning again to the process 70 of FIG. 5, a third step (block 76) of the path traversal method includes selecting the most relevant alarms on the path to Rx failures based on Pearson correlation. The Pearson correlation in this example may include the correlation of three of the most critical failure indicators in the Rx device 24 (e.g., HCCS-OTU, CV-OTU, UAS-OTU), obtained from the PM data, versus the possible alarms raised on the path. With help from the Pearson correlation, the three most relevant alarms (e.g., Alarm optical line fail, Alarm loss of signal, and Alarm automatic shutoff) may be selected. The three alarms in this step (in addition to the four derived alarms created from the previous step) may be used to create "bad hop" labels that could cause failure in the Rx device 24.

Up to this point in the process 70 of FIG. 5, labels for both good Rx hops and bad Rx hops are prepared. In the next step (block 78), for each Rx failure, the algorithm traverses the circuit hop by hop from the first hop to look for bad hop labels (i.e., where a selected standard alarm or derived alarm is presented). The traversing stops at the first hop with an alarm since any subsequent alarms are most likely considered to be consequences of the first alarm in the path. For example, derived alarm #6.1 and #8.1 may be viewed simply as consequences of the derived alarm #5.1. Therefore, the root cause of the failure on the Rx device 24 on the corresponding day (i.e., 2020 May 16) is derived alarm #5.1 at hop 5. Similarly, root cause and location of the rest of the four failures are derived alarm #6.2 for failure on 2020 May 17, derived alarm #8.3 for failure on 2020 May 25, derived alarm #5.2 for failure on 2020 Jul. 1, derived alarm #5.3 for failure on 2020 Jul. 2.

The process 70 further includes a step of determining if there is any alarm in the path before the end of the circuit, as indicated in decision block 80. If yes, the process 70 provides the outputs of the root cause and location of the Rx failures. Otherwise, the process 70 may end and proceed with the use case #2.

Use Case #2: "Triangulation" with Knowledge of Network Topology Information, Rx PM Data, and Rx Alarms Some networks do not have the availability of PM data and standard alarms of every single port in the network. However, the network topology information, the PM data of the Rx device, and Rx alarms are a much smaller dataset and should be much easier to obtain and monitor. In addition, even for networks with a full set of PM data and alarm data of every port that enables the "path traversal" procedure of use case #1, not every single type of issue can be detected by the PM data and standard alarms. For example, conventional networks do not have thorough build-in instrumentation for monitoring polarization related parameters, WSS filter shape effect, fiber nonlinear performance of the entire network, etc. Therefore, Rx failures caused by these types of issues are not detectable by PM data and standard alarms on the path.

However, according to the embodiments of the present disclosure, the systems and methods described herein are configured to cover this use case #2, where the failures are observed by the Rx device while there may be no data available to indicate the issue in the path. Thus, the present disclosure can execute a "triangulation" method to localize the failure in the path. Input features in this case may include network topology information, PM data, and/or standard alarms from the RX ports. The output labels may include groups of failed Rx devices.

Figure 10:
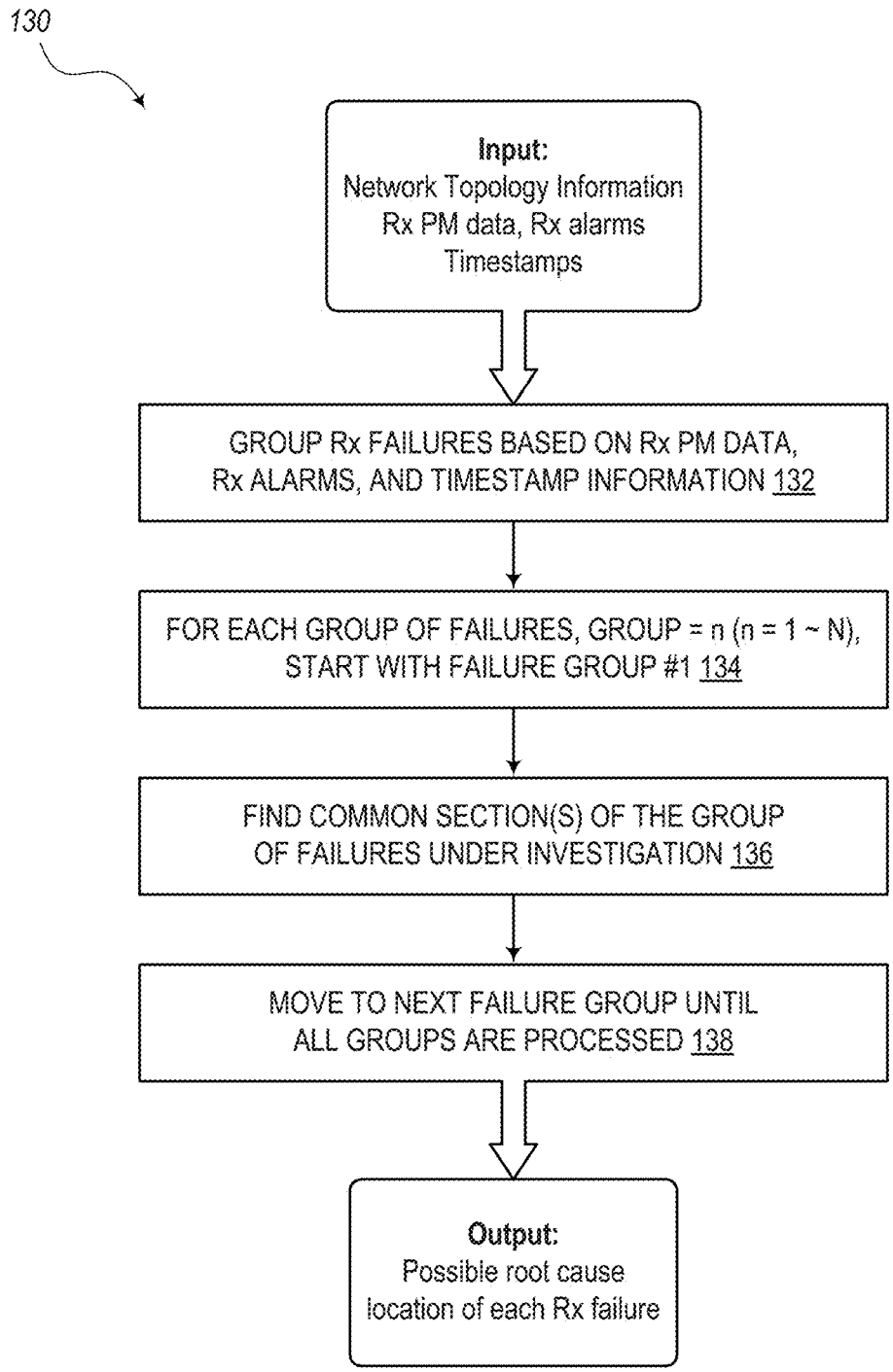
FIG. 10 is a flow diagram illustrating a process related to a second use case shown in FIG. 4, according to various embodiments.

FIG. 10 is a flow diagram illustrating an embodiment of a process 130 related to the second use case (use case #2) shown in FIG. 4 related to the triangulation method. After getting the input data of topology and Rx PM data, standard Rx alarms, and timestamp information, the process 130 includes identifying Rx failures and grouping the failures based on timestamps and PM/alarm data, as indicated in block 132. For example, it may be determined that the Rx device in each group fails at the same time in the same way. Then, for each group of failures (block 134), a group can be determined to be equal to n, where n=1 up to N, and start with the failure group #1. The process 130 finds a common section (e.g., section in an optical network that links two Reconfigurable Optical Add/Drop Multiplexers (ROADMs)) of the failed Rx device as the potential location of the root cause, as indicated in block 136. The process 130 further includes moving to the next failure group (if one exists) until all the groups have been processed, as indicated in block 138. The output includes possible root cause location of each Rx failure.

Use Case #3: Supervised ML for Root Cause Classification with RX PM/Alarm Data Only In this case, the input features only include the PM data and/or standard alarms from the RX ports. Thus, the path PM data, standard path alarms, and network topology information is unknown or unavailable. The output labels in the case include classes of root cause from the "path traversal" method. For this use case #3, since only Rx PM and Rx alarm data are available, it will be impossible to tell the location of the root cause. However, a root cause classification model using only Rx PM data and alarms would be useful for identifying the type of the failures.

Figure 11:
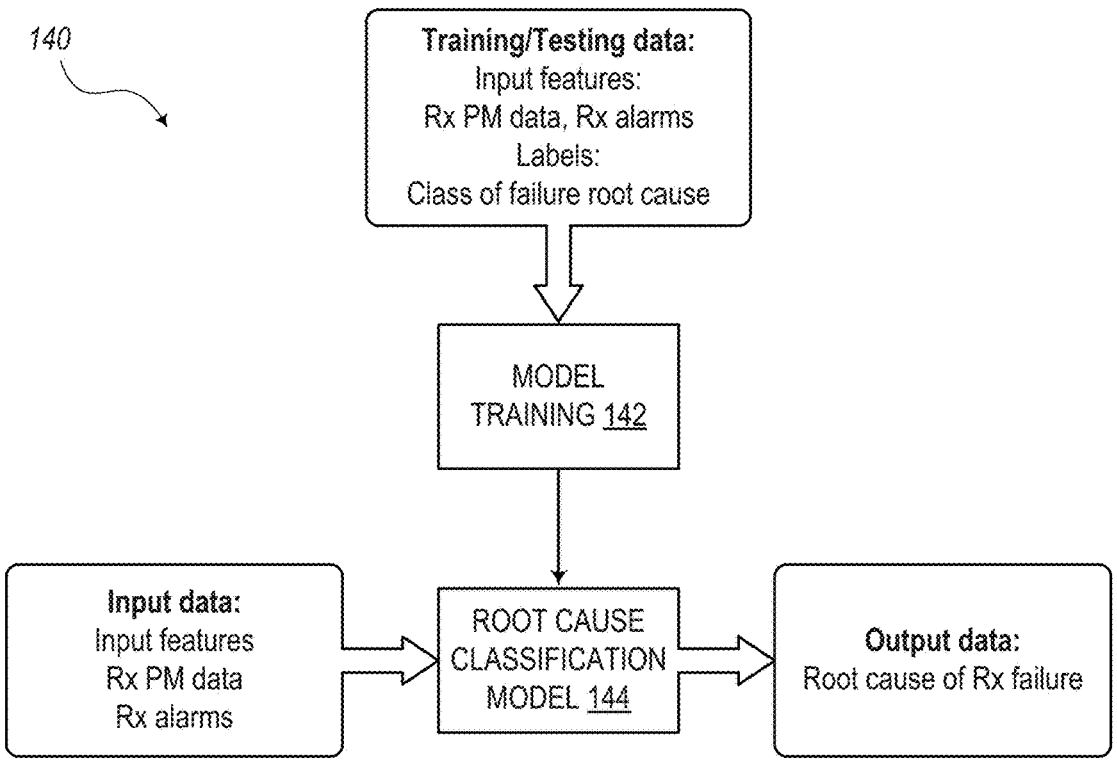
FIG. 11 is a flow diagram illustrating a process related to a third use case shown in FIG. 4, according to various embodiments.

FIG. 11 is a flow diagram illustrating an embodiment of a process 140 related to the third use case (i.e., use case #3) shown in FIG. 4. The process 140 also shows a model that can be used in a case where only Rx PM data is obtained (e.g., from transponders of the various network equipment). For model training, the training data and testing data can be obtained from the path traversal method. The classes and number of instances in the training and testing datasets are shown in table 150 of FIG. 12 Table 152 of FIG. 13 shows the input features of the PM data and standard alarms reported by the receiver Rx.

Figure 12:
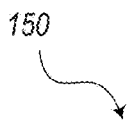
FIG. 12 is a table illustrating a sample of a number of instances of training datasets and testing datasets from a root cause analysis of an example network, according to various embodiments.

FIG. 12 shows the table 150 having a sample of a number of instances of training datasets and testing datasets from a root cause analysis of an example network according to one example. FIG. 13 shows the table 152 having a sample of PM data obtained from an example network for root cause analysis according to one example. XGBoost model is used in this prototype of Rx only root cause classification. FIG. 14 shows a table 154 having a sample of PM data of an example network related to the third use case according to one example. Table 154 shows the performance of the Rx only root cause classification based on XGBoost and shows the classification result.

Figure 15:
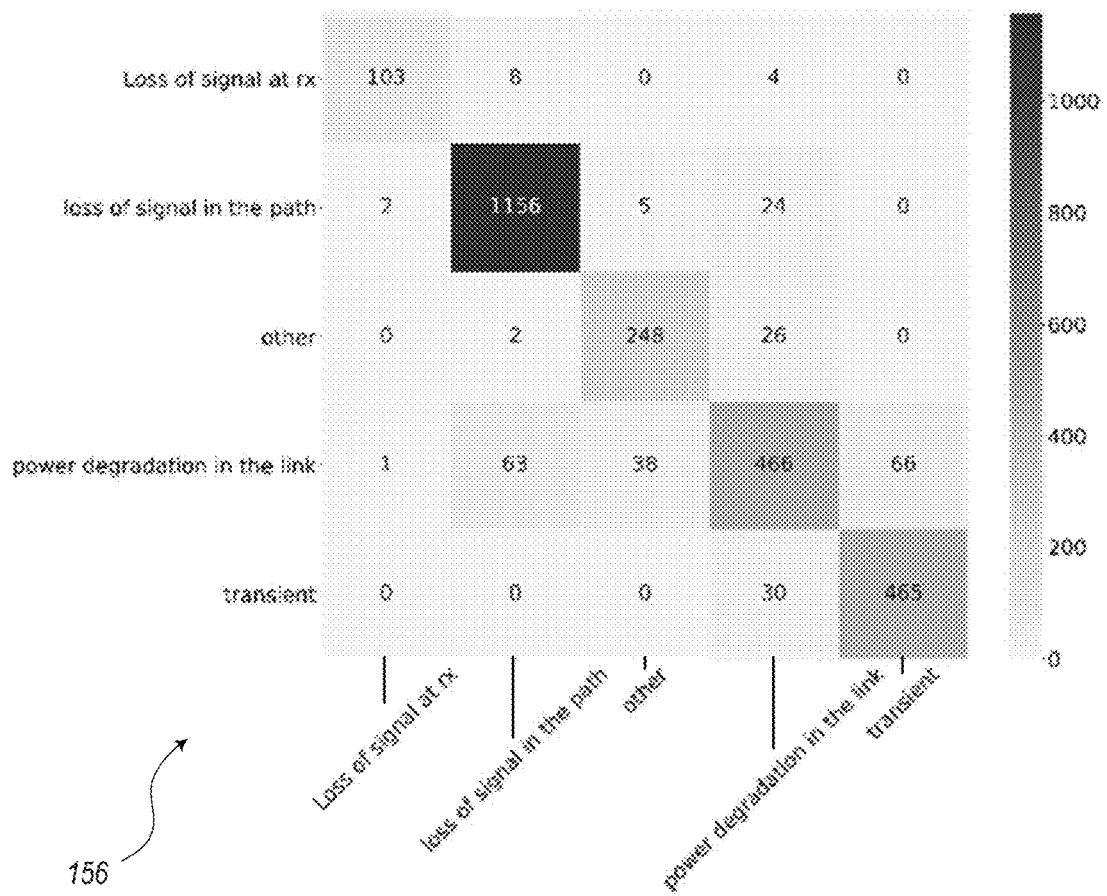
FIG. 15 is a chart illustrating a confusion matrix of alarm data of an example network related to the third use case shown in FIG. 4, according to various embodiments.

FIG. 15 is a chart 156 illustrating a confusion matrix of PM data of an example network related to the third use case shown in FIG. 4. The chart 156 may be related to the confusion matrix of XGBoost for Rx only failure classification.

It may be noted that since the various systems and methods of the present disclosure may be executed for root cause classification of example optical network cards that may not obtain PM data for monitoring non-power-related behaviors, such as polarization parameters (e.g., Polarization Dependent Loss (PDL), Polarization Mode Dispersion (PMD), State of Polarization (SOP), etc.), chromatic dispersion, nonlinear performance, etc. The failure classes that can be identified by PM data of the Rx are limited while the above-mentioned non-power-related failures all go into "other" groups. However, it is hopeful that for new generations of transponders that have richer datasets of PM, the Rx only PM classification could identify more types of failures.

Figure 16:
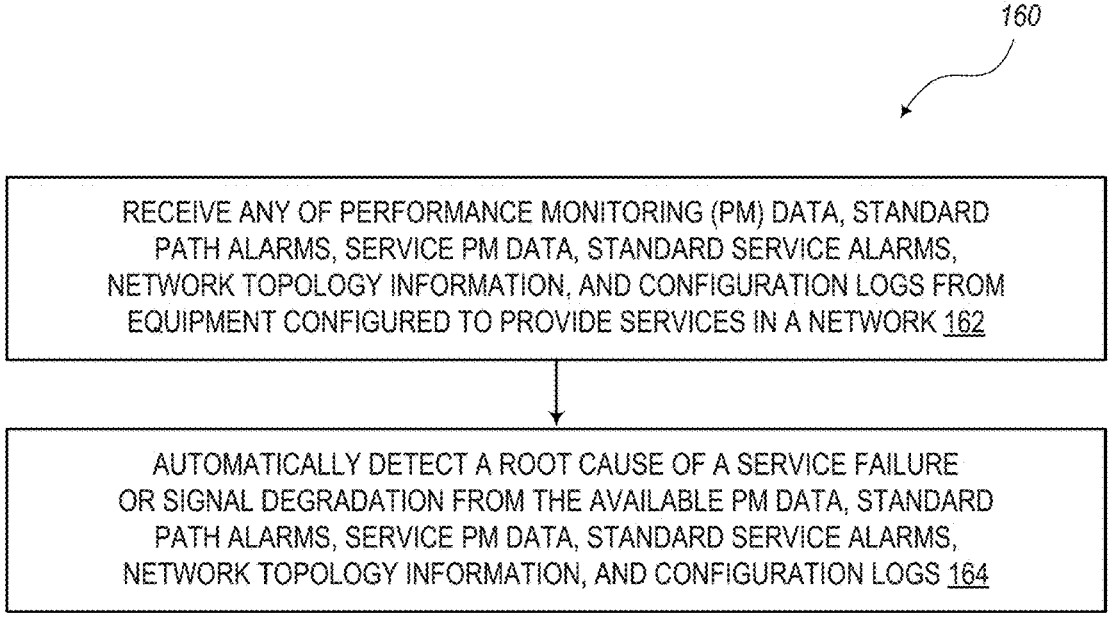
FIG. 16 is a flow diagram illustrating a general process for performing root cause analysis, according to various embodiments of the present disclosure.

FIG. 16 is a flow diagram illustrating a general process 160 for performing root cause analysis, according to one embodiment of the present disclosure. In this embodiment, the process 160 includes the step of receiving any of Performance Monitoring (PM) data, standard path alarms, service PM data, standard service alarms, network topology information, and configuration logs from equipment configured to provide services in a network, as indicated in block 162. The process 160 further includes the step of automatically detecting a root cause of a service failure or signal degradation from the available PM data, standard path alarms, service PM data, standard service alarms, network topology information, and configuration logs.

It should be noted that the process 160 can be further defined according to the following description. For example, the process 160 may include automatically detecting the root cause independently of a network operator associated with the network. For example, the network may be a multi-layer, multi-vendor network. The process 160 may also include the step of determining one or more derived alarms from the available path PM data, standard path alarms, service PM data, standard service alarms, network topology information, and configuration logs, the derived alarms being different from the standard path alarms and standard service alarms. The standard path alarms and standard service alarms, for example, may be threshold-crossing alarms. The one or more derived alarms, for example, may include one or more of PM data patterns, power drops, loss of signal, and network configuration changes. In some embodiments, the step of determining the one or more derived alarms may include determining network conditions that have an impact on the services.

Furthermore, the process 160 can also include the step of performing a Pearson correlation procedure, a derived-alarm generation procedure, a Supervised Machine Learning (SML) procedure and a path traversal procedure when the path PM data, standard path alarms, service PM data, standard service alarms, network topology information, and configuration logs are available. In some embodiments, the process 160 may additionally or alternatively include the step of performing one or more of a triangulation procedure, and a SML procedure when the network topology information and alarms related to receiving equipment are available. In some embodiments, the process 160 may additionally or alternatively include the step of performing a SML procedure for multi-variate root cause classification when alarms related to receiving equipment are available for identifying the service failure or signal degradation.

Also, the process 160 may include additional steps and features. For example, the process 160 may include the step of ranking the standard path alarms based on a level of impact the respective standard path alarms have on the services. The step of ranking the standard path alarms may include the step of utilizing a Pearson correlation technique to determine a usefulness of transmission paths for a service assurance procedure. In some embodiments, the network for which Root Cause Analysis (RCA) is performed may be an optical network having at least a transmitter device, a receiver device, and one or more network devices configured to communicate optical signals along one or more transmission paths.

One of the benefits of the various systems and methods described in the present disclosure is that the solutions may provide automatic failure diagnoses, without the need for network expertise. Network operators, who may use the embodiments described herein, can benefit from the fast and precise diagnoses, which are able to significantly accelerate failure analysis and recovery. Moreover, network operators associated with multi-vendor, multi-layer networks may be more motivated to utilize the systems and methods of the present disclosure since the present embodiments are configured to work with incomplete data and can also work without requiring domain expertise.

ADDITIONAL EMBODIMENTS

Some of the embodiments described above offer a high-level overview of various algorithms, one of which can be summarized as follows:

1. Grouping Rx failures based on Rx PM/alarm data and timestamps.
2. For each group of Rx failures, label common sections amongst their circuits as the potential location of the root cause.
3. One method described with respect to FIG. 4 may be limited to the detection of Layer 0 root cause of specific Layer 1 service issues.

For example, High Correction Count Seconds (HCCS) in an Optical-channel Transport Unit (OTU) (HCCS-OUT) may be used as a metric to indicate failure of a given wavelength service. However, a positive value of HCCS-OTU does not necessarily mean that any service has been lost, only that the Forward Error Correction (FEC) may need to work extra hard to correct errors. According to some embodiments, a better metric to use in this case may be a Severely-Errored Frame Second (SEFS) metric (SEFS-OTU), which gives the number of seconds during which frames were actually dropped (and thus service was lost) in a PM time bin.

Additional details are provided herein regarding the procedure of grouping failures based on Rx PM/alarm data and timestamp, which can be highly subjective. The method of grouping by Rx issues prior to finding a common section may be prone to either mixing Rx issues with different root causes or separating those with a common root cause into separate groups. This is largely due to the fact that, for a given single root cause on Layer 0, different affected services can experience different levels of errors depending on their location in the network topology and the margins available.

In the embodiments described below, the systems and methods may be configured to identify only the sections between ROADMs as potential root cause locations. It may not take into account other wavelengths that pass through the sections but experience no errors. The embodiments described above normally only work with a monolithic group of alarms originating from the same root-cause but might not identify sub-groups of alarms caused by independent root-issues.

Fast and accurate identification of service-affecting hardware issues is an important part of maintaining a healthy telecommunication network. This process is usually performed manually by a team of domain experts using Performance Metric (PM) data, alarms, network topology, and configuration logs, all of which come from different sources and formats, making it difficult to see the full picture of the network in order to pin down the root cause of the issue.

The previous embodiments provide several methods of root cause identification, depending on which information (e.g., PMs, alarms, topology, etc.) is readily available to the user. One of the methods described a technique where issues detected at Layer 1 are grouped together based on the severity of the issue, and Layer 0 sections of the network in common amongst the circuit paths of the affected wavelengths are identified as the likely location of the root cause of the Layer 0 issue. This method is most useful when issues are reported by Layer 1 transponders and when little or no PM/alarm data is available from Layer 0.

The embodiments described below introduce novel and significant improvements to this method and demonstrate its practical effectiveness on real customer data. Also, the embodiments may include a proof-of-concept dashboard that may be integrated with suitable software products related to analytics, assurance, etc.

Therefore, according to some additional embodiments of the present disclosure, the root cause analyzer 66 shown in FIG. 3 may include other features for analyzing one or more root causes in a system or network. Again, the detected root causes are those that may cause one or more services to be negatively impacted in one or more ways and/or may degrade in some measurable way.

Figure 17:
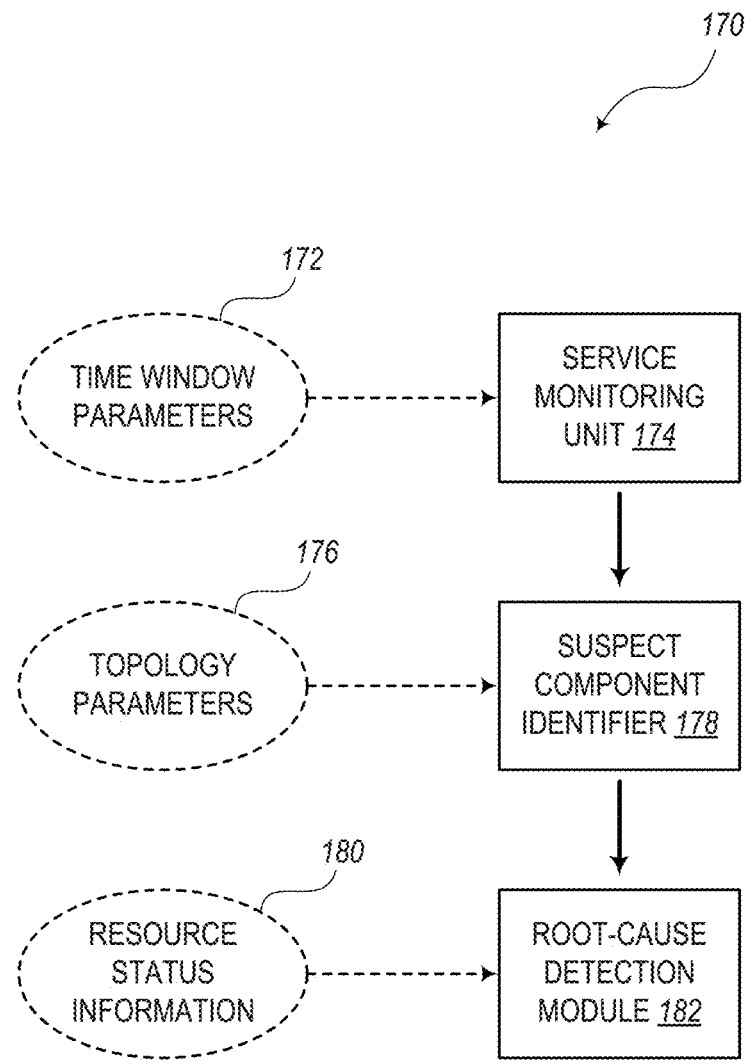
FIG. 17 is a diagram illustrating a root cause analyzer having similarities to the root cause analyzer shown in FIG. 3, according to various embodiments of the present disclosure.

FIG. 17 is a diagram illustrating a root cause analyzer 170, which may have some similarities to the root cause analyzer 66 shown in FIG. 3. Also, the root cause analyzer 170 may be implemented in any suitable combination of hardware, software, and/or firmware. When implemented in software and/or firmware, the root cause analyzer 170 may be stored in the memory device 54, database 60, a non-transitory computer-readable medium, or other suitable storage device in a detection system, the computer system 50, or other suitable computer-based or processor-based devices. When implemented in hardware, the root cause analyzer 170 may be configured in the processing device 52 or one or more other suitable processors in the detection system, the computer system 50, or other suitable devices. In particular, the root cause analyzer 170 of FIG. 17 may enable or cause the processing device 52 or other suitable processors to execute specific functions as described below.

As illustrated, the root cause analyzer 170 of FIG. 17 is configured to receive time window parameters 172 during which Root Cause Analysis (RCA) is performed. The time window parameters 172 are configured to limit the range of times when service issues are detected. In other words, the first criteria for RCA in this embodiment is based on a time constraint. Thus, only issues occurring at about the same time may be considered to be related and if two or more issues occur within unrelated time periods, it can be assumed, in some embodiments, that the issues are unrelated.

The root cause analyzer 170 also includes a service monitoring unit 174, which is configured to detect any significant or relevant issues that have a negative impact on a number of services offered or issued by a system or network being monitored. In particular, the system under test may include an underlying infrastructure where overlying services are offered via the underlying infrastructure. The issues obtained by monitoring the services may be service degradation measurements whereby the quality of the service is reduced in some way. The issues are detected with any specific time window as defined by the time window parameters 172.

Also, the root cause analyzer 170 includes topology parameters 176 that define the topology of associated components, elements, devices, etc. of the underlying infrastructure. In the field of a communications network, the topology may include network elements, switches, routers, multiplexers, demultiplexers, amplifiers, etc. as well as any links (e.g., optical fibers) connecting the various components. The information regarding the corresponding topology parameters 176 is applied to a suspect component identifier 178.

The suspect component identifier 178 is configured to receive the monitored service issues (e.g., from the service monitoring unit 174) within specific periods of time, along with topology information of the infrastructure over which the services are provided. Based on this data, the suspect component identifier 178 is configured to determine one or more components (i.e., suspect components) that may be responsible for causing the issues. Based on different time periods (or time windows) and different clusters of issues within the topology, the suspect component identifier 178 may identify a single suspect component or groups of clusters of components that may be suspect.

In some embodiments, the root cause analyzer 170 is configured to obtain resource status information 180 about the condition of the resources or components of the infrastructure. The resource status information 180 may be obtained from suitable monitoring devices for detecting the operating status, Performance Monitoring (PM) metrics, and other information about the various resources used to provide the services in the network under test. This information, along with information regarding the clusters of suspect components from the suspect component identifier 178, is provided to a root-cause detection module 182. The root-cause detection module 182 is configured to detect the root-cause from the suspect components or clusters (or groups) of suspect components to determine one or more components or groups that are likely to be responsible for causing the service degradation issues.

Therefore, according to some embodiments, the root cause analyzer 170 of FIG. 17 may be configured in a detection system (e.g., having a processing device and memory device) for monitoring a plurality of overlying services offered in an underlying infrastructure having a plurality of resources arranged with a specific topology. In response to detecting a negative impact on one or more of the overlying services during a predetermined time window and based on an understanding of the specific topology, the root cause analyzer 170 may be configured to identify one or more suspect components from the plurality of resources in the underlying infrastructure. Finally, the root cause analyzer 170 is configured to obtain status information with respect to the one or more suspect components to determine a root cause of the negative impact on the one or more overlying services.

The action of identifying the one or more suspect components may include a) performing a coarse clustering procedure to identify the one or more suspect components based on the predetermined time window, b) subsequent to the coarse clustering procedure, performing a refined clustering procedure based on the understanding of the specific topology to detect one or more refined clusters of the resources, and c) identifying one or more potential root-causes for each of the one or more refined clusters. Also, identifying the one or more suspect components may further include ranking the one or more potential root-causes and selecting a single root-cause from the one or more potential root-causes based on the ranking.

The root cause analyzer 170 may be part of a detection system (e.g., computer system 50) that further comprises a user interface (e.g., a graphical user interface, I/O interface 56, etc.) The root cause analyzer 170 may be configured to display an interactive dashboard on the user interface. For example, the interactive dashboard may be configured to display a representation of at least the one or more suspect components and associated connections therebetween according to the specific topology. The interactive dashboard may also be configured to highlight the one or more suspect components within the representation. In response to receiving a request from a user to obtain further information about a selected suspect component of the one or more suspect components, the root cause analyzer 170 may be configured cause the user interface to display additional information about the selected suspect component.

Furthermore, the action of detecting the negative impact on the one or more overlying services may also include a step of obtaining one or more service alarms, where each service alarm may include a raise time when an issue is first raised, a clear time when the issue is cleared, and a description of the issue. The description of the issue, for instance, may include a threshold-crossing event.

Also, the detected negative impact on the one or more overlying services, described above, may include one or more of a reduction in a Quality of Service (QoS) score, a reduction in a Quality of Experience (QoE) score, a change in a Key Performance Indicator (KPI) metric, a Loss of Signal (LOS) or risk of LOS, a detection of a link being down, a Signal-to-Noise Ratio (SNR) falling below a predetermined threshold, a latency event, a breach in a Service Level Agreement (SLA), and a Performance Metric (PM) degradation trend. The underlying infrastructure, described above, may be an optical communications network.

The root cause analyzer 170, in some respects, may be configured to expand the scope of the triangulation use case shown in FIG. 4, whereby "triangulation," as defined in the present disclosure, may refer to a three-phase procedure for analyzing root causes. In some embodiments, the three-phase procedure may include (1) service monitoring (e.g., by the service monitoring unit 174), (2) suspect component identification (e.g., by the suspect component identifier 178), and (3) root-cause detection (e.g., by the root-cause detection module 182). This may be applicable to many use cases for many specific types of network services.

Although the root cause analyzer 170 may be applicable to any suitable environment or infrastructure, many of the examples described in the present disclosure may be directed to communications networks, such as optical communications networks. Service-alarms, for example, may refer to Layer 1 service-alarms, where a unit of measure of Severely-Errored Frame Seconds (SEFS) measured at an Optical-channel Transport Unit (OTU) may be used to define a possible failure of a given wavelength service on an optical system. SEFS-OTU may represent the number of seconds that frames have been dropped.

Rather than initially grouping based on Rx failures, the root cause analyzer 170 may be configured to collect all Rx failures together and iteratively group them into Single Root-Cause Clusters (SRCCs) using the network topology (e.g., topology parameters 176). This procedure may avoid the potential issue of separating issues with the same root cause into separate SRCCs.

The root cause analyzer 170 may be configured to consider equipment (e.g., of the infrastructure being monitored) that either emits service-affecting alarms or has a higher fraction of dependent services with issues as having a higher probability of being the root cause. Thus, rather than identifying root cause by a section of a network, the root cause analyzer 170 is configured to identify specific equipment (e.g., suspect components) that is most likely to be the root cause of the service issues.

According to the various implementations of the present disclosure, the root cause analyzer 170 may be configured to perform RCA based on the two main factors of timing and topology. The clusters may be formed based on issues happening at about the same time. After this, the clusters of these service issues may be narrowed based on corresponding topology parameters.

A system or network may have multiple services issued or offered at the same time. These can be clustered based on the time at which the service issues come up, as well as information regarding the underlying topology. This technique is used in order to find the one or more root causes of these issues.

Again, the systems and methods of the present disclosure may include a procedure that includes a first step of clustering a number of services that have issues at the same time, where the quality of each service degrades in some way (e.g., reduction in QoS, QoE, etc.) and may be based on alarms. A second step may include determining the underlying resources that the affected services have in common, which can use the topology to find the common resources. For example, the affected services may be hosted by the same server (which might be suffering), while the server itself may need to be rebooted. The underlying resources may include a single device or even a path. It could be any system, industry, infrastructure (e.g., telecommunications system), where services are offered by a set of resources. Finally, a third step may include determining a root cause from the timing and topology characteristics.

Considering a list of service-alarms, the present embodiment is able to work progressively to narrow down a number of suspect devices based on timing and topology characteristics. This may be done by grouping together the service-alarms that have a common root-cause and separate them from other unrelated service-alarms.

The systems and methods of the present disclosure may be used for a wide variety of services, which may include, for example:

a) Layer-1 optical channels (Optical-channel Transport Unit (OUT), Optical Data Unit (ODU), or the like), wireless channels (802.11),
b) Layer-2 Ethernet vLAN, WLAN,
c) Layer-3 link or IP/MPLS tunnel or segment routing,
d) Over-the-top SD-WAN,
e) Radio Access Network (RAN) cell tower base (eNodeB),
f) virtual or physical network functions (encryption, firewall, routers, . . . ), and
g) Layer-4 streaming or TCP/IP, as well video streaming, online gaming or other software applications relying on telecommunications network, among others. Services can be related to an inter-connected domain from RAN, last mile, aggregation, and core to external networks. The three-step procedure could be used to determine if one of these domains is the root-cause for multiple eNodeB issues.

All of the above services can be characterized by quantitative Quality of Service (QoS) and/or Quality of Experience (QoE) scores based on Key Performance Indicator (KPI) metrics. Furthermore, in some cases, quality expectations for QoS and QoE can be expressed as a Service-Level Agreement (SLA).

Service Alarms

The term "service-alarm" may refer to any event or alarm triggered by the degradation of the QoS or QoE scores. Just like any alarm, a service-alarm may be characterized by a raise time, a clear time, and a description. Examples of service-alarms may include:

1. Regular alarm natively produced by network equipment, such as SIGNAL_DEGRADE_OCH, Low_SNR (Wi-Fi), Loss of Signal (LOS), LINK_DOWN, far-end client signal failure,
2. Regular events produced by network applications, such as video buffering, application freeze,
3. Threshold-crossing alarms produced by network assurance software. For example, this may include any service KPI going above/below a threshold t, such as:
    a) L1 (OTU): SEFS>t, QAVG<t, HCCS>t, UNCFECBLK>t, SES>t, UAS>t
    b) L1 (ODU): delay>t, SES>t
    c) L2 (ETH): in/out frames error>t, CV>t, SES>t, UAS>t
    d) L3: latency>t, jitter>t, dropped packets>t This may also include any service KPI going outside its SLA range in general, any combination of KPIs, such as (QAVG-QMIN)>t, (OPRAVG-OPRMIN)>t, and/or trends of degrading PMs over time.

4. Smart alarms reported by NHP, such as Risk of LOS

Timing Characteristics

By grouping service-alarms based on "timing," the systems and methods of the present disclosure may be related to various embodiments, such that:
1. If based on native alarm with exact raise time, a sliding window or time bin can be used, and the procedure may be configured to:
   a) Group all service-alarms within given time range
   b) Group service-alarms with clustering algorithms like k-means or DBSCAN
   c) Use approximate matching methods such as dynamic time-warping algorithms
2. If using service alarms from KPI binned in time (1-day, 15-min), the present embodiment may be configured to do the same, except that time resolution may not be exact, and the procedure may be configured to:
3. If resolution is not sufficient, use alarm duration in the grouping algorithm, such as:
   a) If KPI with similar number of errored seconds
   b) Alarms are similar clear-raise time duration
It may be noted, however, that for some alarms this method may be difficult due to differences in service margins before alarms are triggered
4. If alarms from devices are not available, this time-based clustering could also be performed based on services simultaneously having similar degradation patterns in the PM time series.

Topology Characteristics

By grouping service-alarms based on "topology," the systems and methods of the present disclosure may refer to different embodiments, such as:
1. If the services (overlay) rely on a set of resources (underlay), the procedures may be configured to:
   a) Collect resources (e.g., multi-layer) from all services that have raised an alarm
   b) Identify resource(s) in common to the most alarmed services, such as by:
      i. creating a group for service-alarms using this common resource
      ii. removing these service-alarms from the pool
      iii. repeating with other remaining service-alarms
2. It may be noted that this process may work equally well if the underlay resources have an ordered sequence or "path" (e.g., spans supporting an OTN channel, links supporting an IP/MPLS tunnel, or the like) or if they have no ordering (e.g., list of computers supporting virtual network functions).

Three-Step Procedure

The three-step procedure may include:
1. Coarse clustering of service alarms based on timing.
2. Refined clustering of service alarms based on topology, which may include:
   a) Breaking a single coarse cluster into smaller groups of service alarms based on topology (hereafter referred to as Single Root Cause Clusters (SRRC)), and
   b) For each SRRC, highlight common resources as potential root-cause resources.
3. Identification of root-cause for each refined cluster. If multiple common resources are found in the refined clustering step, then, for each SRRC, this step may include ranking the common resources in order of a decreasing likelihood of root-cause. For example, this likelihood can be defined as:
   a) A fraction of dependent services degraded or unhealthy. For each resource, the step may include checking the health of all of its dependent services, even those not considered in steps 1 and 2. The term "unhealthy" in this context may refer to:
      i. Exhibiting service-alarms, or
      ii. Exhibiting similar temporal trends in its performance metrics as those exhibiting service alarms, even if no alarming threshold have not yet been crossed
   b) A number (and/or severity) of equipment alarms reported by the resources themselves.

As a result of performing the three-step procedure, a network system may be configured to a) improve precision of alarm grouping compared to timing-based only, b) locate likely root-cause of several service-alarms and reduce troubleshooting efforts, c) prioritize alarms occurring on the root cause resource, d) deprioritize or close other alarms along the service paths, e) provide labels for supervised machine learning use cases to predict alarms raised by underlay infrastructure will be service-impacting (e.g., if the SRRC only contains one common resource, if only one resource has a high likelihood of root cause, and/or if root-cause was confirmed by manual troubleshooting for a SRRC), and/or other operations. For each identified root cause resource, the present systems may proactively raise new alarms on its carried services for which a service-alarm has not yet been triggered. Also, the results of the three-step procedure can be exported to assurance software for visualization and service impact assessment and prioritization with respect to other ongoing issues in a network under test.

Figure 18:
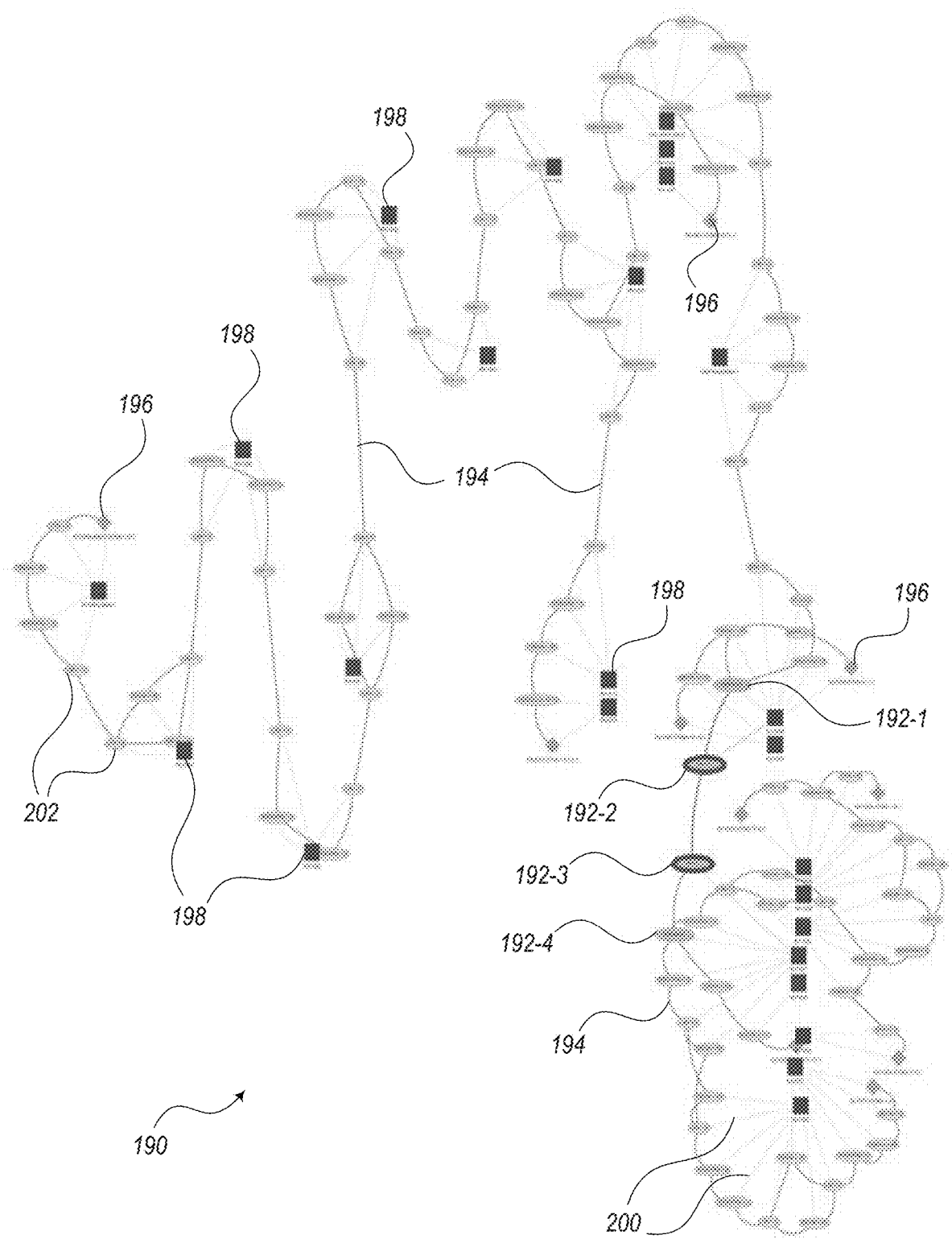
FIG. 18 is a diagram illustrating a Single Root Cause Cluster (SRCC) identified by a three-step procedure, according to various embodiments.

FIG. 18 is a diagram illustrating an example of a Single Root Cause Cluster (SRCC) 190 identified by the three-step procedure. The SRCC 190 shows four cards 192 in this example, where the cards 192-1, 192-2, 192-3, 192-4 are in common amongst the circuit paths of a number of wavelengths (ten wavelengths in this example). As illustrated, cards 192-2 and 192-3 are shown with highlighted borders to indicate that they exhibit alarms. Since these cards themselves exhibit alarms, this information can be used to determine an increase in the likelihood that they are the root cause of the issues seen at transponders 196 (e.g., OTM4 transponders).

The SRCC 190 may be displayed as a dashboard or other suitable visual format to visualize the results of the RCA of the present disclosure. The SRCC 190 and/or other dashboards may be displayed in a User Interface (UI), Graphical User Interface (GUI), the I/O interface 56, or other suitable display device. In this example, FIG. 18 demonstrates the three-step procedure performed on Layer 0 circuits of the Crown Castle Fiber network on historical PM data from 2021 Feb. 3. A service in this example can be defined as a single wavelength traveling between Layer 1 transponders over the Layer 0 network. Service-alarm are defined as an OTM4 transponder reporting SEFS-OTU>10.

The SRCC 190 is a visualization of a single cluster of possible root-causes resulting from the three-step procedure or other RCA. The SRCC 190 shows colored squares, ovals, and diamonds for representing nodes 198, the cards 192, and the OTM4 transponders 196, respectively. Nodes 198 are positioned according to their relative geographical locations. The paths 194 are shown as solid lines over which wavelengths travel from transponder 196 to transponder 196. Other paths 200 are shown as dashed lines and are configured to connect cards 192 to their nodes 198.

This SRCC 190 consists of ten OTM4 transponders 196 in this example, all of which report SEFS-OTU>10 for a specific time period or time period (e.g., one particular date). Other equipment 202 in the network is depicted as ovals on which all of a plurality of services depend, making this equipment 202 potential root cause resources as well (e.g., step 2).

Therefore, the SRCC 190 can be used to help a user (e.g., network operator) quickly and easily visualize results of the three-step procedure (e.g., RCA). The SRCC 190 can display a geographical map of the layer-0 circuit paths for a given SRCC, with the most likely root cause candidates highlighted. Also, SRCC 190 may be presented as an interactive display. By clicking on a piece of equipment in the map, the root cause analyzer 170 may be configured to further display Layer 1 PM metrics for each wavelength passing through the selected piece of equipment and/or any alarms reported by that equipment, if available. The extra information may be presented on the UI in any suitable manner (e.g., pop-up window, images or text superimposed over the SRCC 190, etc.).

It may be noted that, in the network shown in FIG. 18, there may be multiple services offered over multiple paths via multiple network elements. Some service may experience some issues while other may operate normally. For Layer 1 services, usually the root causes are not at the point where the services are measured, but somewhere around the location of equipment in Layer 0. For example, at Layer 0 (e.g., a fiber path 194 or device 192, 196, 198, 202), multiple services may be supported.

Thus, the SRCC 190 may show a snapshot (or status over the relevant time window) that allows a user to see services that are experiencing issues at the same time. For example, "same time" in this respect may mean "within a sliding window," and may include the use of a learning technique (e.g., DBSCAN) for grouping these issues in time, etc. Since these service degradation events are happening at about the same time, the root cause analyzer 170 can be configured to take all the events and look for all the underlying resources that they have in common. In some cases, it may be possible that there is no underlying equipment that is common to all these impacted services, which might be an indication that there is more than one root cause. The root cause analyzer 170 may be configured to take the equipment that is most in common for all these service-impacting events and group (cluster) the network elements into the single root cause cluster (e.g., SRCC 190). In some embodiments, FIG. 18 may show just a relevant section of an entire network being monitored, of which service degradation is experienced.

The transponders 196 may also represent services having issues. The paths 194 (or circuit paths) in the network environment are where signals travel from one port (e.g., transponder 196 port) to another. In the example of FIG. 18, service issues are shown with respect to nodes 198, representing multiple paths 194, including at least one path 194 from Pittsburgh to New York. The ten services (e.g., transponders 196) are experiencing issues at the same time. In this example, the service degradation depends on the two LIN cards 192-2 and 192-3 (e.g., amplifiers).

In some cases, a network may have service layer alarms going off at different geographical locations or physical layers. It can be determined that these services having issues at the same time share some common physical devices in the underlying layer. The root cause analyzer 170 can be used to determine which ones of the components are in suspected locations that may be related to the root cause and may include devices or the fibers (e.g., optical fiber links) between them.

Figure 19:
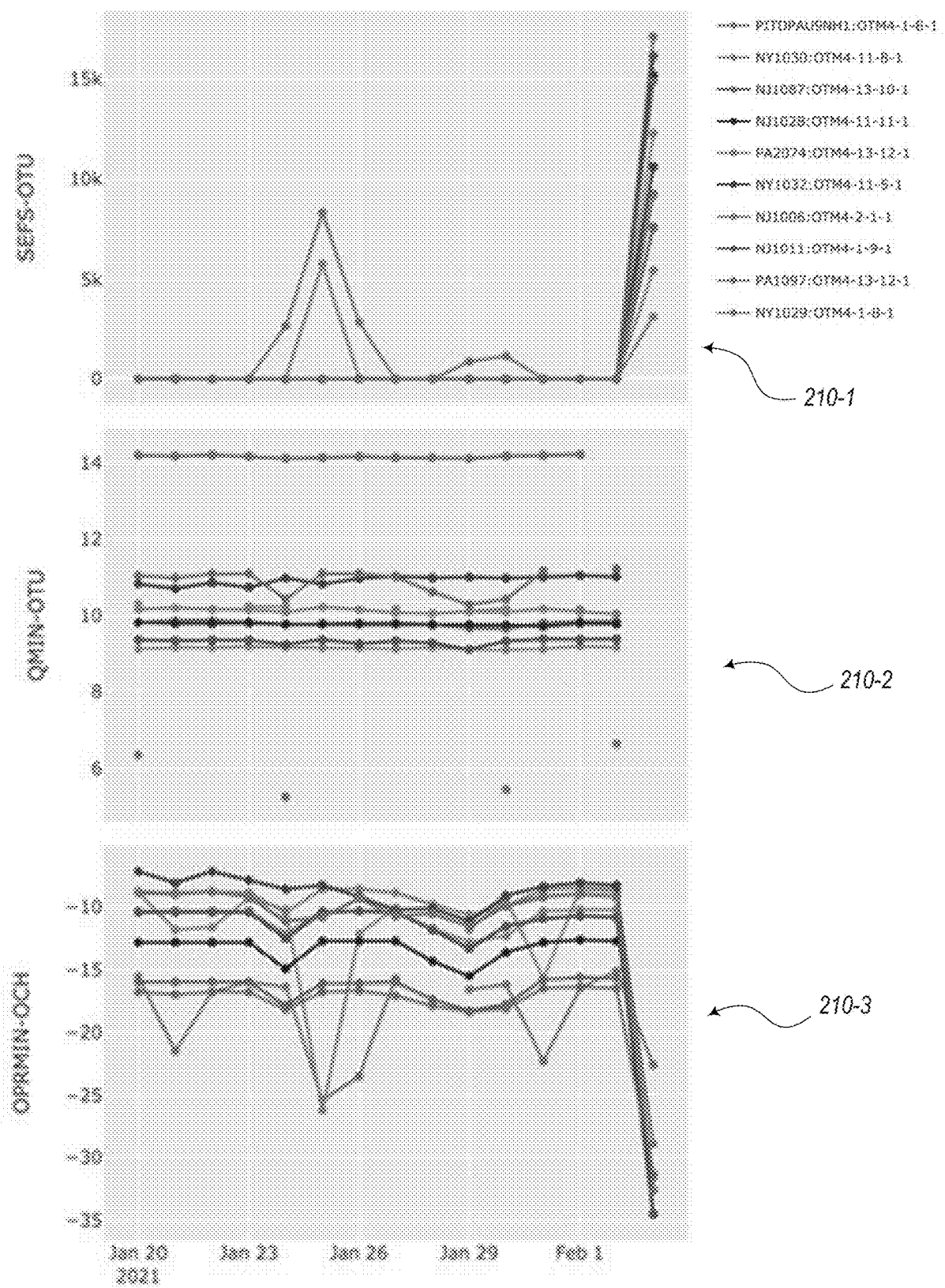
FIG. 19 is a set of graphs illustrating examples of daily-binned PMs as a function of time of an SRCC, such as the SRCC with a number of wavelengths as depicted in FIG. 18.

FIG. 19 is a set of graphs 210-1, 210-2, 210-3 illustrating examples of daily-binned performance metrics as a function of time of a root cause cluster, such as the SRCC 170 showing ten wavelengths as depicted in FIG. 18. The graphs 210 show the daily-binned performance metrics for the OTM4 transponders 196 in this root cause cluster. It may be observed that the graphs 210 illustrate a qualitatively similar jump in SEFS-OTU and a decrease in OPRMIN-OCH for all wavelengths, which supports the hypothesis that all of these issues likely share a common root cause. It may be noted as well that, while all of the wavelengths have SEFS-OTU>10, they span a wide range of values (from ~3000 to 18000 seconds). This result highlights the importance of not initially grouping the wavelengths by severity of the errors before identifying the root cause section, since doing so may unintentionally separate wavelengths with the same root cause issue.

The addition of alarms or Layer 0 PM data can be used to further narrow down the root cause. In this example, it can be seen that of the four root cause cards 192, the two LIM cards 192-2, 192-3 reported High Received Span Loss alarms on the same date that the wavelength issues occurred, while the two WSS cards 192-1, 192-4 did not report any alarms. Thus, the two LIM cards 192-2, 192-3, and the fibers connecting them have a higher likelihood of being the true root cause of the service-alarms in the SRRC 190.

It may be noted that the SRCC 190 of FIG. 18 may represent just one cluster. However, in some cases, there may be multiple clusters (e.g., SRCCs) detected, each of which may represent a distinct service-impacting event that can be identified as being unrelated, in a sense, from the other service-impacting event. In other words, there may be multiple root causes. Thus, multiple SRCCs may be detected, the data of each SRCC being presented to the user (e.g., network operator) for analysis. The methods described herein may be performed for each and all SRRCs discovered on the network to identify the root cause(s) of service-affecting issues quickly and easily, allowing network operators to respond to and repair issues much more efficiently, saving both time and money.

Figure 20:
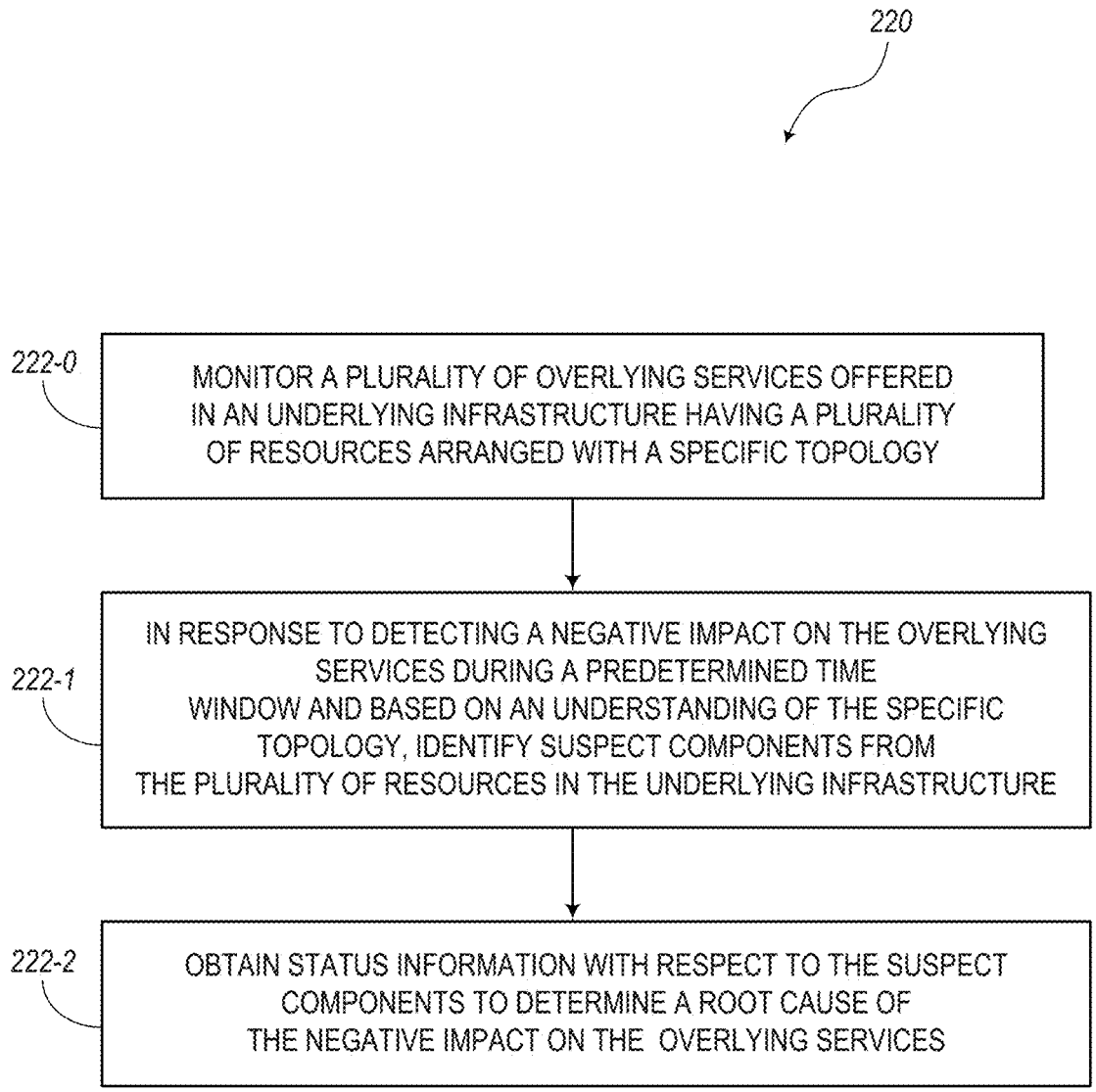
FIG. 20 is a flow diagram illustrating a process for performing Root Cause Analysis (RCA), which may be associated with the functionality of the root cause analyzer of FIG. 17, according to various embodiments of the present disclosure.

FIG. 20 is a flow diagram illustrating an embodiment of a process 220 for performing RCA and may be associated with the functionality of the root cause analyzer 170 of FIG. 17. In the illustrated embodiment, the process 220 may include a first step of monitoring a plurality of overlying services offered in an underlying infrastructure having a plurality of resources arranged with a specific topology, as indicated in block 222-0. In response to detecting a negative impact on the overlying services during a predetermined time window and based on an understanding of the specific topology, the process 220 may include the step of identifying suspect components from the plurality of resources in the underlying infrastructure, as indicated in block 222-1. Also, the process 220 may include the step of obtaining status information with respect to the suspect components to determine a root cause of the negative impact on the overlying services, as indicated in block 222-2.

According to some embodiments, the step of identifying the suspect components (block 222-1) may include the sub-steps of (a) performing a coarse clustering procedure to identify the suspect components based on the predetermined time window, (b) subsequent to the coarse clustering procedure, performing a refined clustering procedure based on the understanding of the specific topology to detect one or more refined clusters of the resources, and (c) identify one or more potential root-causes for each of the one or more refined clusters. For example, identifying the suspect components may further include (i) ranking the one or more potential root-causes, and (ii) selecting a single root-causes from the one or more potential root-causes based on the ranking.

The process 220 may be associated with a detection system (e.g., computer system 50) that includes a user interface (e.g., I/O interface 56). As such, the process 220 may further include displaying an interactive dashboard on the user interface, whereby the interactive dashboard may be configured to display a representation of at least the suspect components and associated connections therebetween according to the specific topology. Also, the interactive dashboard may be configured to highlight the suspect components within the representation. In response to receiving a request from a user to obtain further information about a selected suspect component of the suspect components (e.g., by the user clicking on a selectable item associated with the equipment), the process 220 may be further display additional information about the selected suspect component.

The step of detecting the negative impact on the overlying services (block 222-1) may further include the step of obtaining one or more service alarms, where each service alarm includes a raise time when an issue is first raised, a clear time when the issue is cleared, and a description of the issue. The description of the issue may include a threshold-crossing event.

In some embodiments, the detected negative impact on the one or more overlying services may include a) a reduction in a Quality of Service (QoS) score, b) a reduction in a Quality of Experience (QoE) score, c) a change in a Key Performance Indicator (KPI) metric, d) a Loss of Signal (LOS) or risk of LOS, e) a detection of a link being down, f) a Signal-to-Noise Ratio (SNR) falling below a predetermined threshold, g) a latency event, h) a breach in a Service Level Agreement (SLA), i) a Performance Metric (PM) degradation trend, and/or one or more other results. Also, according to some embodiments, the process 220 may be executed in an environment where the underlying infrastructure is an optical communications network.

Therefore, the systems and methods of the present disclosure are configured to provide additional benefits and point of novelty with respect to conventional systems. For example, the present disclosure describes the three-step procedure to identify the common root cause of multiple service-alarms. This can be used in an iterative method of grouping service-alarms based on timing and looking at common resources (based on topology) as the potential root cause of multiple service-alarms. This can include starting from a coarse monolithic group of alarms and then identifying sub-groups of alarms (e.g., Single Root Cause Cluster (SRCC), etc.) caused by independent root-issues.

The systems and methods may combine a number of independent methods for identifying root-issues, namely a) a timing-based method, b) a topology-based method, and c) and alarm-based method. This combination can result in higher precision compared to any of the individual methods. Within each SRCC described herein, each resource can be ranked by its likelihood of being the root-cause of overlay service-alarms. The ranking, for example, may be based on a) a fraction of dependent services with issues, where dependent services may be weighted by a variety of factors (such as SLAs), b) alarms reported by the resource, etc.

Once a root-cause resource is identified, the root cause analyzer 170 may be configured to proactively raise new alarms on its carried services for which a service-alarm has not yet been triggered. This may include a priority of such root-cause alarms may be increased. Also, other alarms along the service path may be flagged as related to the above root-cause alarms, deprioritized, or automatically closed.

Furthermore, the root cause analyzer 170 can use the above methods to label datasets of underlay infrastructure alarms according to their overlay service impact. This may be applicable, for example, if: a) the SRRC only contains one common resource, b) only one resource has a high likelihood of root cause, and/or c) if root-cause was confirmed by manual troubleshooting for a SRRC. Also, the scope of the three-step procedure may be expanded for use cases in many specific types of network services.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A detection system comprising
a processing device, and
a memory device configured to store computer logic having instructions that enable the processing device to
monitor a plurality of overlying services offered in an underlying infrastructure having a plurality of resources arranged with a specific topology,
in response to detecting a negative impact on the overlying services during a predetermined time window and based on an understanding of the specific topology, identify suspect components from the plurality of resources in the underlying infrastructure by obtaining service alarms or degradation patterns and grouping the service alarms or degradation patterns raised within a predetermined time bin, identifying all resources of the overlying services associated with the grouped raised service alarms or degradation patterns, and identifying resources common to a greatest number of the grouped raised service alarms or degradation patterns as the suspect components, and
obtain status information with respect to the suspect components to determine a root cause of the negative impact on the overlying services.

2. The detection system of claim 1, wherein identifying the suspect components includes
performing a coarse clustering procedure to identify the suspect components based on the predetermined time window,
subsequent to the coarse clustering procedure, performing a refined clustering procedure based on the understanding of the specific topology to detect refined clusters of the resources, and
identifying one or more potential root-cause clusters for each of the refined clusters.

3. The detection system of claim 2, wherein identifying the suspect components of a given root cause cluster further includes
ranking the one or more potential root-causes, and selecting a single root-cause from the one or more potential root-causes based on the ranking.

4. The detection system of claim 1, further comprising a user interface, wherein the instructions further enable the processing device to display an interactive dashboard on the user interface, and wherein the interactive dashboard is configured to display a representation of at least the suspect components and associated connections therebetween according to the specific topology.

5. The detection system of claim 4, wherein the interactive dashboard is configured to
highlight the suspect components within the representation, and
in response to receiving a request from a user to obtain further information about a selected suspect component of the suspect components, display additional information about the selected suspect component.

6. The detection system of claim 1, wherein detecting the negative impact on the overlying services includes obtaining the service alarms, each service alarm including a raise time when an issue is first raised, a clear time when the issue is cleared, and a description of the issue.

7. The detection system of claim 6, wherein the description of the issue includes a threshold-crossing event.

8. The detection system of claim 1, wherein the detected negative impact on the overlying services includes one or more of a reduction in a Quality of Service (QoS) score, a reduction in a Quality of Experience (QoE) score, a change in a Key Performance Indicator (KPI) metric, a Loss of Signal (LOS) or risk of LOS, a detection of a link being down, a Signal-to-Noise Ratio (SNR) falling below a predetermined threshold, a latency event, a breach in a Service Level Agreement (SLA), and a Performance Metric (PM) degradation trend.

9. The detection system of claim 1, wherein the underlying infrastructure is an optical communications network.

10. A non-transitory computer-readable medium configured to store computer logic having instructions that enable a processing device to
monitor a plurality of overlying services offered in an underlying infrastructure having a plurality of resources arranged with a specific topology,
in response to detecting a negative impact on the overlying services during a predetermined time window and based on an understanding of the specific topology, identify suspect components from the plurality of resources in the underlying infrastructure by obtaining service alarms or degradation patterns and grouping the service alarms or degradation patterns raised within a predetermined time bin, identifying all resources of the overlying services associated with the grouped raised service alarms or degradation patterns, and identifying resources common to a greatest number of the grouped raised service alarms or degradation patterns as the suspect components, and
obtain status information with respect to the suspect components to determine a root cause of the negative impact on the overlying services.

11. The non-transitory computer-readable medium of claim 10, wherein identifying the suspect components includes
performing a coarse clustering procedure to identify the suspect components based on the predetermined time window,
subsequent to the coarse clustering procedure, performing a refined clustering procedure based on the understanding of the specific topology to detect one or more refined clusters of the resources, and
identifying one or more potential root-cause clusters for each of the one or more refined clusters.

12. The non-transitory computer-readable medium of claim 11, wherein identifying the suspect components of a given root-cause cluster further includes
ranking the one or more potential root-causes, and
selecting a single root-cause from the one or more potential root-causes based on the ranking.

13. The non-transitory computer-readable medium of claim 10, further comprising a user interface, wherein the instructions further enable the processing device to display an interactive dashboard on the user interface, and wherein the interactive dashboard is configured to display a representation of at least the suspect components and associated connections therebetween according to the specific topology.

14. The non-transitory computer-readable medium of claim 13, wherein the interactive dashboard is configured to
highlight the suspect components within the representation, and
in response to receiving a request from a user to obtain further information about a selected suspect component of the suspect components, display additional information about the selected suspect component.

15. The non-transitory computer-readable medium of claim 10, wherein detecting the negative impact on the overlying services includes obtaining the service alarms, each service alarm including a raise time when an issue is first raised, a clear time when the issue is cleared, and a description of the issue.

16. The non-transitory computer-readable medium of claim 15, wherein the description of the issue includes a threshold-crossing event.

17. A method comprising the steps of:
monitoring a plurality of overlying services offered in an underlying infrastructure having a plurality of resources arranged with a specific topology,
in response to detecting a negative impact on of the overlying services during a predetermined time window and based on an understanding of the specific topology, identifying suspect components from the plurality of resources in the underlying infrastructure by obtaining service alarms or degradation patterns and grouping the service alarms or degradation patterns raised within a predetermined time bin, identifying all resources of the overlying services associated with the grouped raised service alarms or degradation patterns, and identifying resources common to a greatest number of the grouped raised service alarms or degradation patterns as the suspect components, and
obtaining status information with respect to the suspect components to determine a root cause of the negative impact on the overlying services.

18. The method of claim 17, wherein identifying the suspect components includes
performing a coarse clustering procedure to identify the suspect components based on the predetermined time window,
subsequent to the coarse clustering procedure, performing a refined clustering procedure based on the understanding of the specific topology to detect one or more refined clusters of the resources,
identifying one or more potential root-causes for each of the one or more refined clusters,
ranking the one or more potential root-causes, and selecting a single root-cause from the one or more potential root-causes based on the ranking.

19. The method of claim 17, further comprising the step of displaying an interactive dashboard on a user interface, wherein the interactive dashboard is configured to
- show a representation of at least the suspect components and associated connections therebetween according to the specific topology,
- highlight the suspect components within the representation, and
- in response to receiving a request from a user to obtain further information about a selected suspect component of the suspect components, display additional information about the selected suspect component.

20. The method of claim 17, wherein the detected negative impact on the overlying services includes one or more of a reduction in a Quality of Service (QoS) score, a reduction in a Quality of Experience (QoE) score, a change in a Key Performance Indicator (KPI) metric, a Loss of Signal (LOS) or risk of LOS, a detection of a link being down, a Signal-to-Noise Ratio (SNR) falling below a predetermined threshold, a latency event, a breach in a Service Level Agreement (SLA), and a Performance Metric (PM) degradation trend.

* * * * *